United States Patent
Stahle et al.

(10) Patent No.: US 11,591,017 B2
(45) Date of Patent: Feb. 28, 2023

(54) PILOT NEUTRALIZING SYSTEM

(71) Applicant: DEERE & COMPANY, Moline, IL (US)

(72) Inventors: Scott R. Stahle, Dubuque, IA (US); Brian K. Kellogg, Bellevue, IA (US); Grant R. Henn, Dubuque, IA (US)

(73) Assignee: Deere & Company, Moline, IL (US)

( * ) Notice: Subject to any disclaimer, the term of this patent is extended or adjusted under 35 U.S.C. 154(b) by 221 days.

(21) Appl. No.: 17/249,195

(22) Filed: Feb. 23, 2021

(65) Prior Publication Data
US 2022/0001920 A1 Jan. 6, 2022

Related U.S. Application Data

(60) Provisional application No. 62/705,581, filed on Jul. 6, 2020.

(51) Int. Cl.
*B62D 12/00* (2006.01)
*E02F 9/22* (2006.01)
*E02F 9/08* (2006.01)

(52) U.S. Cl.
CPC .............. *B62D 12/00* (2013.01); *E02F 9/225* (2013.01); *E02F 9/0841* (2013.01)

(58) Field of Classification Search
CPC .......... B62D 12/00; B62D 5/09; E02F 9/0841
See application file for complete search history.

(56) References Cited

U.S. PATENT DOCUMENTS 3,771,424 A * 11/1973 Allen ..................... B62D 5/061
                                                         91/433
3,993,158 A * 11/1976 Weight ................... B62D 12/00
                                                         60/494

(Continued)

FOREIGN PATENT DOCUMENTS

DE          68926456 T2    1/1997
DE          19823910 A1    12/1998

(Continued)

OTHER PUBLICATIONS

German Search Report issued in application No. DE102021117185.7 dated Apr. 26, 2022 (11 pages).

(Continued)

*Primary Examiner* — Kevin Hurley

(57) ABSTRACT

A pilot neutralizing system of a work vehicle may include a pilot neutralizer. The work vehicle may include a first frame portion and a second frame portion. The work vehicle has an actuating assembly used to pivot the first frame portion relative to the second frame portion. The pilot neutralizer is electrically coupled to a controller receiving a signal indicative of an articulation position. The pilot neutralizer is hydraulically coupled between an operator control member and a steering valve to selectively change a pilot signal at the steering valve. The pilot signal is used to switch the steering valve to change a direction of a hydraulic fluid flowing from the steering valve to the actuating assembly. When the articulation position reaches a cushion region during steering, the pilot neutralizer is de-energized or energized by the controller to change the pilot signal at the steering valve to resist the actuating assembly from moving.

29 Claims, 22 Drawing Sheets

(56) References Cited

U.S. PATENT DOCUMENTS

| | | | | |
|---|---|---|---|---|
| 4,914,913 | A | * | 4/1990 | St. Germain ............ B62D 5/09 |
| | | | | 60/462 |
| 5,117,935 | A | * | 6/1992 | Hall ....................... B62D 5/061 |
| | | | | 60/446 |
| 9,200,645 | B2 | | 12/2015 | Krahn |
| 2011/0132681 | A1 | | 6/2011 | Graeve |
| 2016/0002886 | A1 | | 1/2016 | Vigholm |
| 2019/0257328 | A1 | | 8/2019 | Erikksson et al. |
| 2022/0002971 | A1 | * | 1/2022 | Stable ................... E02F 9/2285 |

FOREIGN PATENT DOCUMENTS

| | | | | |
|---|---|---|---|---|
| DE | 102018204834 A1 | | 10/2018 | |
| DE | 102021117185 A1 | * | 1/2022 | ............. B62D 12/00 |
| JP | 2005297924 A | | 10/2005 | |
| JP | 2006347212 A | | 12/2006 | |

OTHER PUBLICATIONS

German Search Report issued in application No. DE102021117193.8 dated Apr. 26, 2022 (10 pages).
German Search Report issued in application No. DE102021117194.6 dated Apr. 26, 2022 (06 pages).
Pilot Steering Hydraulic System Portion, pp. 1-2, prior art dated Apr. 11, 2019.

* cited by examiner

PILOT NEUTRALIZING SYSTEM

RELATED APPLICATIONS

This claims priority to U.S. Application No. 62/705,581, titled Pilot Neutralizing System, filed on Jul. 6, 2020, which is hereby incorporated by reference in its entirety.

FIELD OF THE DISCLOSURE

The present disclosure relates generally to a pilot neutralizing system applied to a work vehicle that has an articulated feature.

BACKGROUND OF THE DISCLOSURE

Pilot (steering) neutralizers are used in articulated machines to provide a steering stop cushion prior to frame to frame contact. This is accomplished by neutralizing either the steer right or steer left pilot signal working on the main steering valve when the machine nears full articulation. For instance, when approaching full steer left, the steering valve left pilot is neutralized. Similarly, when approaching full steer right, the steering valve right pilot is neutralized. Once the steering valve left or right pilot is neutralized, the steering motion slows down or is stopped.

SUMMARY OF THE DISCLOSURE

According to an aspect of the present disclosure, a work vehicle may include a frame assembly, an actuating assembly, a fluid pump, a steering valve, a pilot source, an operator control member, and a pilot neutralizing system. The frame assembly has a first frame portion and a second frame portion pivotally coupled to the first frame portion. The actuating assembly is configured to pivot the first frame portion relative to the second frame portion. The fluid pump is configured to provide a hydraulic fluid to actuate the actuating assembly. The steering valve is hydraulically coupled to the fluid pump and the actuating assembly and is configured to change a direction of the hydraulic fluid to operate the actuating assembly based on positions of the steering valve. The pilot source is configured to provide a pilot signal. The operator control member is coupled to the pilot source and configured to at least partially determine the pilot signal at the steering valve. The pilot signal is configured to determine the positions of the steering valve. The pilot neutralizing system may include a controller and a pilot neutralizer. The controller is configured to electrically receive a signal indicative of an articulation position between the first frame portion and the second frame portion. The pilot neutralizer is electrically coupled to the controller and hydraulically coupled between the operator control member and the steering valve so as to selectively change the pilot signal at the steering valve. When the articulation position between the first frame portion and the second frame portion reaches a cushion region during steering, the pilot neutralizer is one of de-energized and energized by the controller to change the pilot signal at the steering valve to resist the actuating assembly from moving.

According to an aspect of the present disclosure, a pilot neutralizing system of a work vehicle may include a pilot neutralizer. The work vehicle may include a frame assembly and an actuating assembly. The frame assembly has a first frame portion and a second frame portion pivotally coupled to the first frame portion. The actuating assembly is configured to pivot the first frame portion relative to the second frame portion. The pilot neutralizer is electrically coupled to a controller receiving a signal indicative of an articulation position between the first frame portion and the second frame portion. The pilot neutralizer is hydraulically coupled between an operator control member and a steering valve to selectively change a pilot signal at the steering valve. The pilot signal is configured to switch the steering valve so as to change a direction of a hydraulic fluid flowing from the steering valve to the actuating assembly. When the articulation position between the first frame portion and the second frame portion reaches a cushion region during steering, the pilot neutralizer is one of de-energized and energized by the controller to change the pilot signal at the steering valve to resist the actuating assembly from moving.

According to an aspect of the present disclosure, a method for controlling an actuating assembly of a work vehicle during steering, comprising: detecting an articulation position between a first frame portion and a second frame portion during steering; receiving a signal indicative of the articulation position by a controller electrically coupled to a pilot neutralizer; changing a powering status of the pilot neutralizer by the controller so as to change a pilot signal at a steering valve when the articulation position between the first frame portion and the second frame portion reaches a cushion region during steering; and changing positions of the steering valve at least partially determined by the pilot direction of the pilot signal to change a direction of a hydraulic fluid flowing into the steering valve, so as to resist the actuating assembly from moving to pivot the first frame portion relative to the second frame portion.

According to an aspect of the present disclosure, a pilot neutralizing system of a work vehicle may include a controller, a pilot neutralizer, a first sensor, and a second sensor. The work vehicle may include a frame assembly and an actuating assembly. The frame assembly has a first frame portion and a second frame portion pivotally coupled to the first frame portion. The actuating assembly is configured to pivot the first frame portion relative to the second frame portion. The controller is configured to electrically receive a signal indicative an articulation position between the first frame portion and the second frame portion. The pilot neutralizer is electrically coupled to the controller, and hydraulically coupled between an operator control member and a steering valve to selectively provide a communication of a pilot signal. The pilot neutralizer may include a neutralizer unit having a first neutralizer and a second neutralizer cooperating with the first neutralizer to provide the communication of pilot signal. When the articulation position between the first frame portion and the second frame portion reaches a cushion region during steering, the first neutralizer and the second neutralizer are configured to be one of de-energized and energized by the controller to change the pilot signal at the steering valve to resist the actuating assembly from moving. The first sensor is coupled to the first neutralizer and is configured to detect a first value. The second sensor is coupled to the second neutralizer and is configured to detect a second value. The first value and the second value are configured to diagnose the first neutralizer to determine whether the first neutralizer is incorrectly in one of a de-energized state and an energized state and to diagnose the second neutralizer to determine whether the second neutralizer is incorrectly in one of the de-energized state and the energized state.

According to an aspect of the present disclosure, a method of diagnosing a pilot neutralizing system of a work vehicle having a first frame portion and a second frame portion pivotally coupled to the first frame portion, the method comprising: detecting an articulation position between the first frame portion the second frame portion; receiving a signal indicative of the articulation position by a controller electrically coupled to a pilot neutralizer, the pilot neutralizer including a neutralizer unit having a first neutralizer and a second neutralizer cooperating with the first neutralizer to provide the communication of a pilot signal; detecting a first value indicating a current state of the first neutralizer in response to a first power signal based on the articulation position by a first sensor; detecting a second value indicating a current state of the second neutralizer in response to a second power signal based on the articulation position by a second sensor; and diagnosing whether the first neutralizer and the second neutralizer is incorrectly in one of a de-energized state and an energized state by the controller based on the first value and the second value.

According to an aspect of the present disclosure, a pilot neutralizing system of a work vehicle may include a pilot neutralizer and a first sensor. The work vehicle may include a frame assembly and an actuating assembly. The frame assembly has a first frame portion and a second frame portion pivotally coupled to the first frame portion. The actuating assembly is configured to pivot the first frame portion relative to the second frame portion. The pilot neutralizer is electrically coupled to a controller and is hydraulically coupled between an operator control member and a steering valve to selectively provide a communication of a pilot signal. When the articulation position between the first frame portion and the second frame portion reaches a cushion region, the pilot neutralizer is configured to be one of de-energized and energized to change the direction of the pilot signal to resist the actuating assembly from moving. The first sensor is coupled to the pilot neutralizer and is configured to detect a first value to diagnose the pilot neutralizer to determine whether the pilot neutralizer is incorrectly in one of a de-energized state and an energized state.

According to an aspect of the present disclosure, a pilot neutralizing system of a work vehicle may include a pilot neutralizer and a flow control apparatus. The work vehicle may include a frame assembly and an actuating assembly. The frame assembly has a first frame portion and a second frame portion pivotally coupled to the first frame portion. The actuating assembly is configured to pivot the first frame portion relative to the second frame portion. The pilot neutralizer is hydraulically coupled between an operator control member and a steering valve to selectively direct a pilot signal to the steering valve and is hydraulically coupled to a reservoir via a reservoir line. The pilot signal is configured to switch the steering valve so as to change a direction of a hydraulic fluid flowing from the steering valve to the actuating assembly.

The flow control apparatus is hydraulically coupled to the reservoir line and is configured to change a draining rate of the pilot signal to the reservoir. When the articulation position between the first frame portion and the second frame portion reaches a cushion region during steering, the pilot neutralizer changes the direction of the pilot signal such that the pilot signal drains back through the flow control apparatus to the reservoir to resist the actuating assembly from moving.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
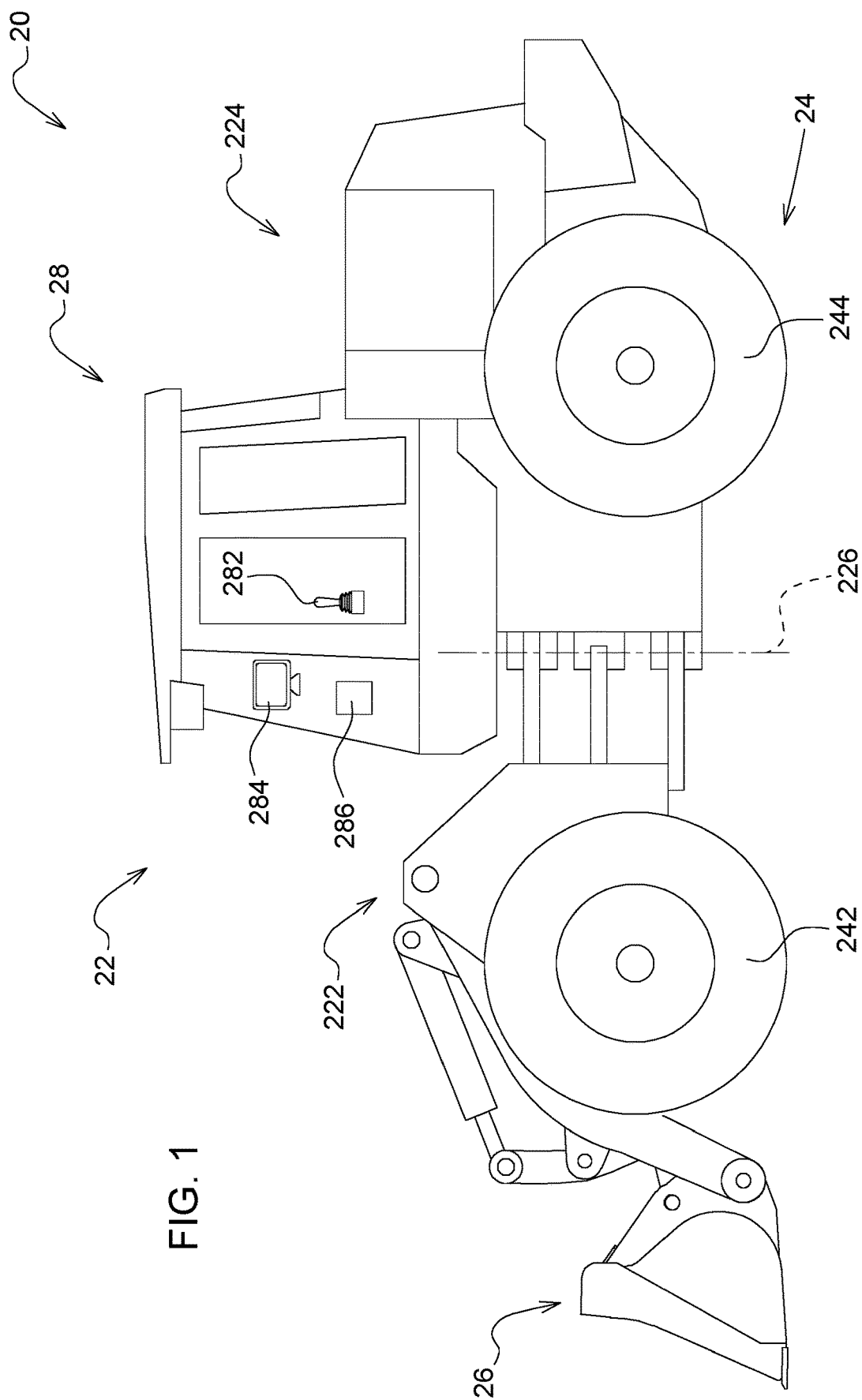
FIG. 1 demonstrates a side view of a work vehicle.
Figure 2A:
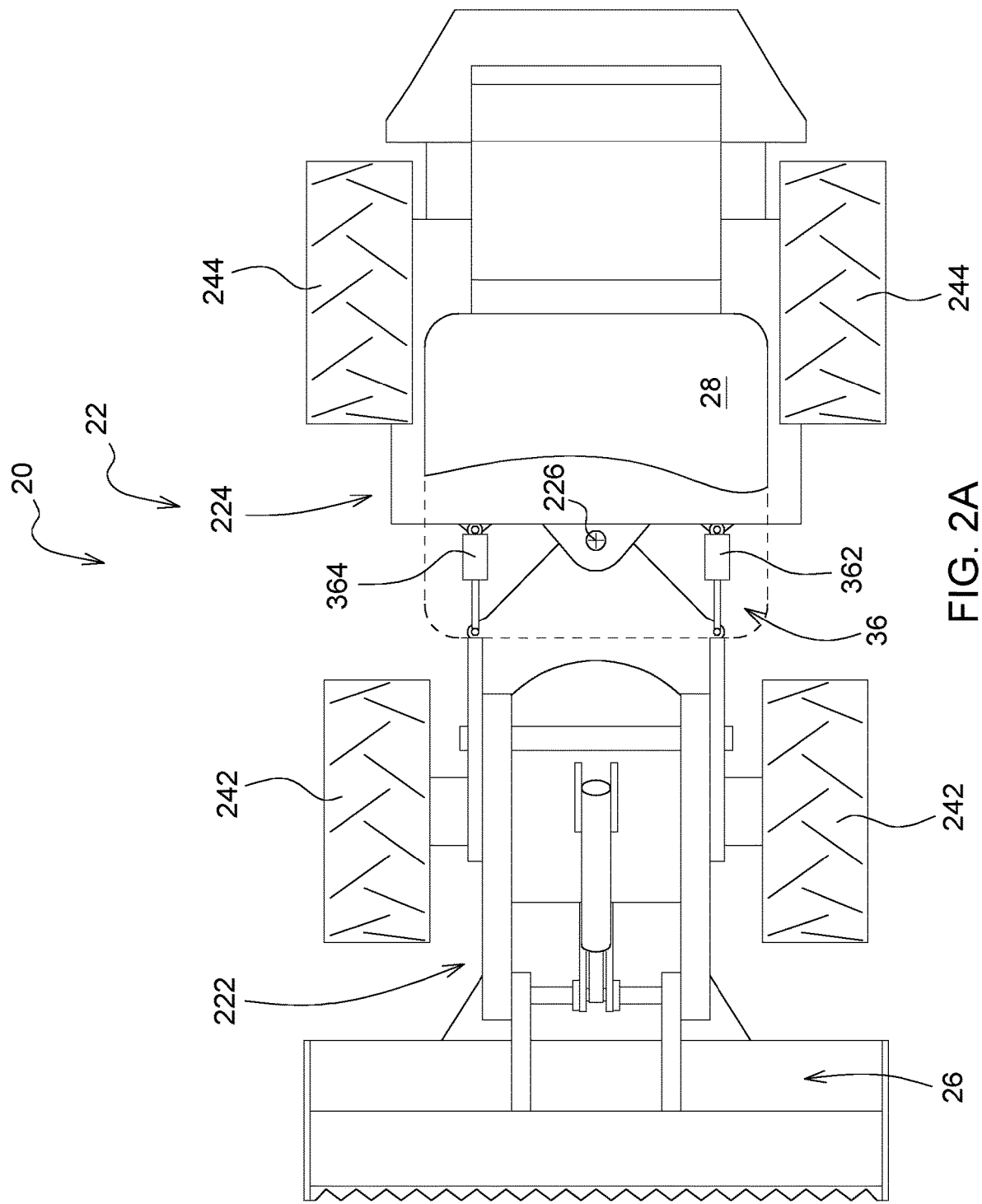
FIG. 2A demonstrates a top view of the work vehicle shown in FIG. 1.

Referring to FIGS. 1 and 2A, a work vehicle 20 having an articulated feature such as a loader is shown. The work vehicle 20 includes a frame assembly 22 having a first frame portion 222 and a second frame portion 224 pivotally coupled to the first frame portion 222. The first frame portion 222 can be pivoted relative to the second frame portion 224 about a pivot axis 226. The work vehicle 20 includes a ground engaging apparatus 24 having front wheels 242 coupled to the first frame portion 222, and rear wheels 244 coupled to the second frame portion 224. A work tool 26 (e.g. a bucket) in this example is coupled to the first frame portion 222. The work vehicle 20 also includes a cab 28 for an operator to operate the vehicle. The cab 28 is equipped with an operator control member 282, a display 284, and an indicator 286.

The operator control member 282 in this example is a joystick for the operator to steer the work vehicle 20 left and right via an actuating assembly 36. In this example, the actuating assembly 36 is coupled to the first frame portion 222 and the second frame portion 224 and has a first cylinder 362 (or first actuator) positioned at the left side of the work vehicle 20 and a second cylinder 364 (or second actuator) positioned at the right side of the work vehicle 20. When the first cylinder 362 retracts and the second cylinder 364 extends, the work vehicle 20 steers left. In contrast, when the second cylinder 364 retracts and the first cylinder 362 extends, the work vehicle 20 steers right. It is also noted that the number of the cylinders is only for illustration. The actuating assembly 36 may only include one cylinder positioned at or adjacent to one side of the work vehicle 20. The only one cylinder retracts and extends to pivot the first frame portion 222 relative to the second frame portion 224.

Figure 3:
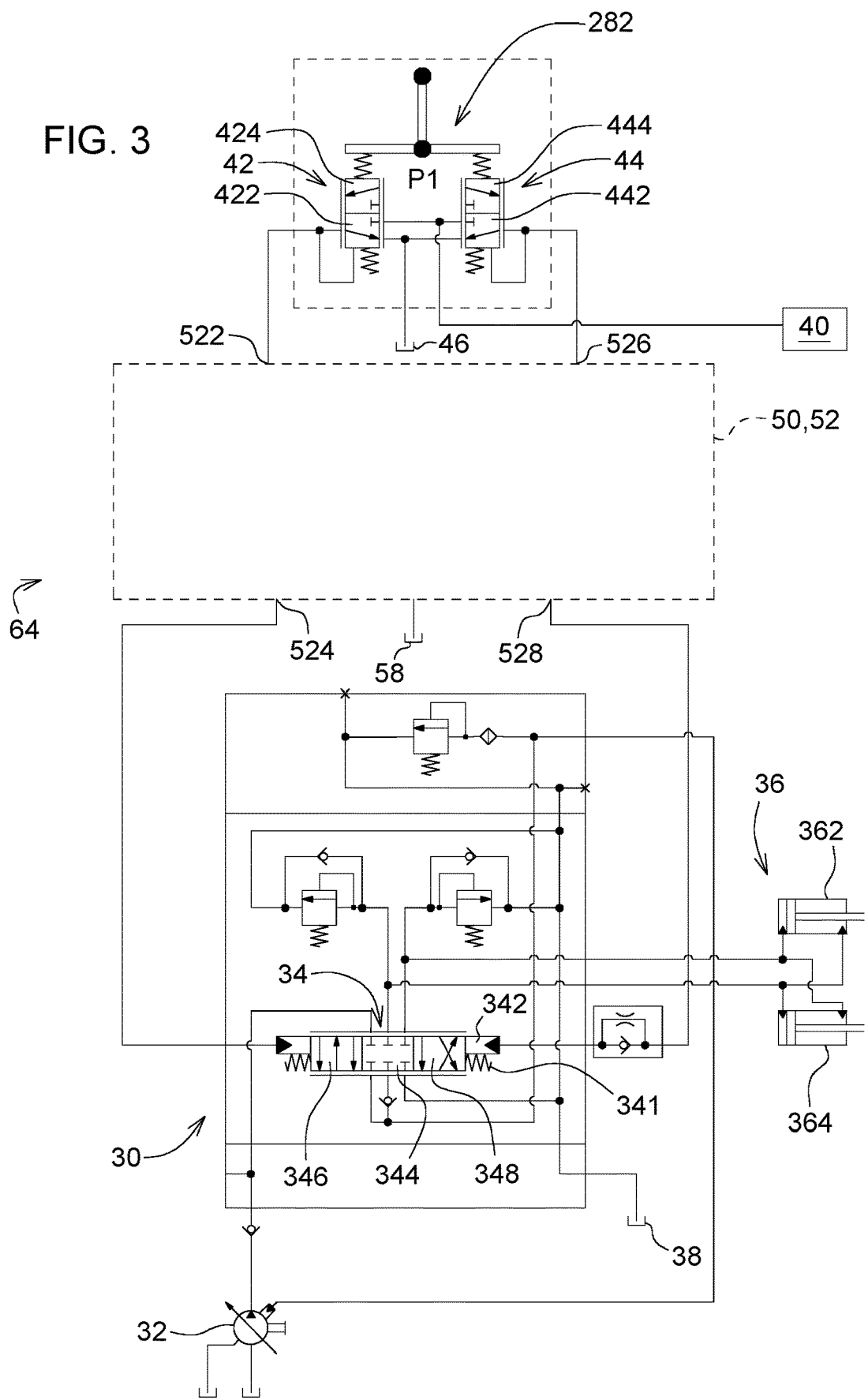
FIG. 3 demonstrates a schematic of a hydraulic circuit coupled to a pilot neutralizing system, which is coupled to an operator control member.

Referring to FIG. 3, a hydraulic circuit 30 is hydraulically coupled to a pilot neutralizing system 50 by a pilot signal, and the pilot neutralizing system 50 will be described with multiple embodiments later. The pilot neutralizing system 50 is also hydraulically coupled to the operator control member 282. The hydraulic circuit 30 includes a fluid pump 32, a steering valve 34, the actuating assembly 36, and a reservoir 38. The fluid pump 32 is configured to provide a hydraulic fluid to actuate the actuating assembly 36. The steering valve 34 is hydraulically coupled between the fluid pump 32 and the actuating assembly 36. The steering valve 34 in this example is a proportional control valve so as to control the first cylinder 362 and the second cylinder 364 progressively. The steering valve 34 has a steering spool 342. The steering valve 34 is configured to change a direction of the hydraulic fluid to operate the actuating assembly 36 based on a movement of the steering spool 342. In the current example, the steering valve 34 is a 3-position, 6-way valve. The three positions 344, 346, 348 can be switched based on the movement of the steering spool 342. When the position 344 of the steering valve 34 is coupled to the actuating assembly 36 and the fluid pump 32, no hydraulic fluid is pumped to or drains back from the first cylinder 362 and the second cylinder 364. When the position 346 of the steering valve 34 is coupled to the actuating assembly 36 and the fluid pump 32, the hydraulic fluid from the fluid pump 32 will enter a rod chamber of the first cylinder 362 and the hydraulic fluid from a cap chamber of the first cylinder 362 will drain back to the reservoir 38, and the hydraulic fluid from the fluid pump 32 will enter a cap chamber of the second cylinder 364 and the hydraulic fluid from a rod chamber of the second cylinder 364 will drain back to the reservoir 38. Accordingly, the first cylinder 362 retracts and the second cylinder 364 extends, and the work vehicle 20 steers left. On the contrary, when the position 348 of the steering valve 34 is coupled to the actuating assembly 36 and the fluid pump 32, the hydraulic fluid from the fluid pump 32 will enter the rod chamber of the second cylinder 364 and the hydraulic fluid from the cap chamber of the second cylinder 364 will drain back to the reservoir 38, and the hydraulic fluid from the fluid pump 32 will enter the cap chamber of the first cylinder 362 and the hydraulic fluid from the rod chamber of the first cylinder 362 will drain back to the reservoir 38. Accordingly, the second cylinder 364 retracts and the first cylinder 362 extends, and the work vehicle 20 steers right.

Figure 2B:
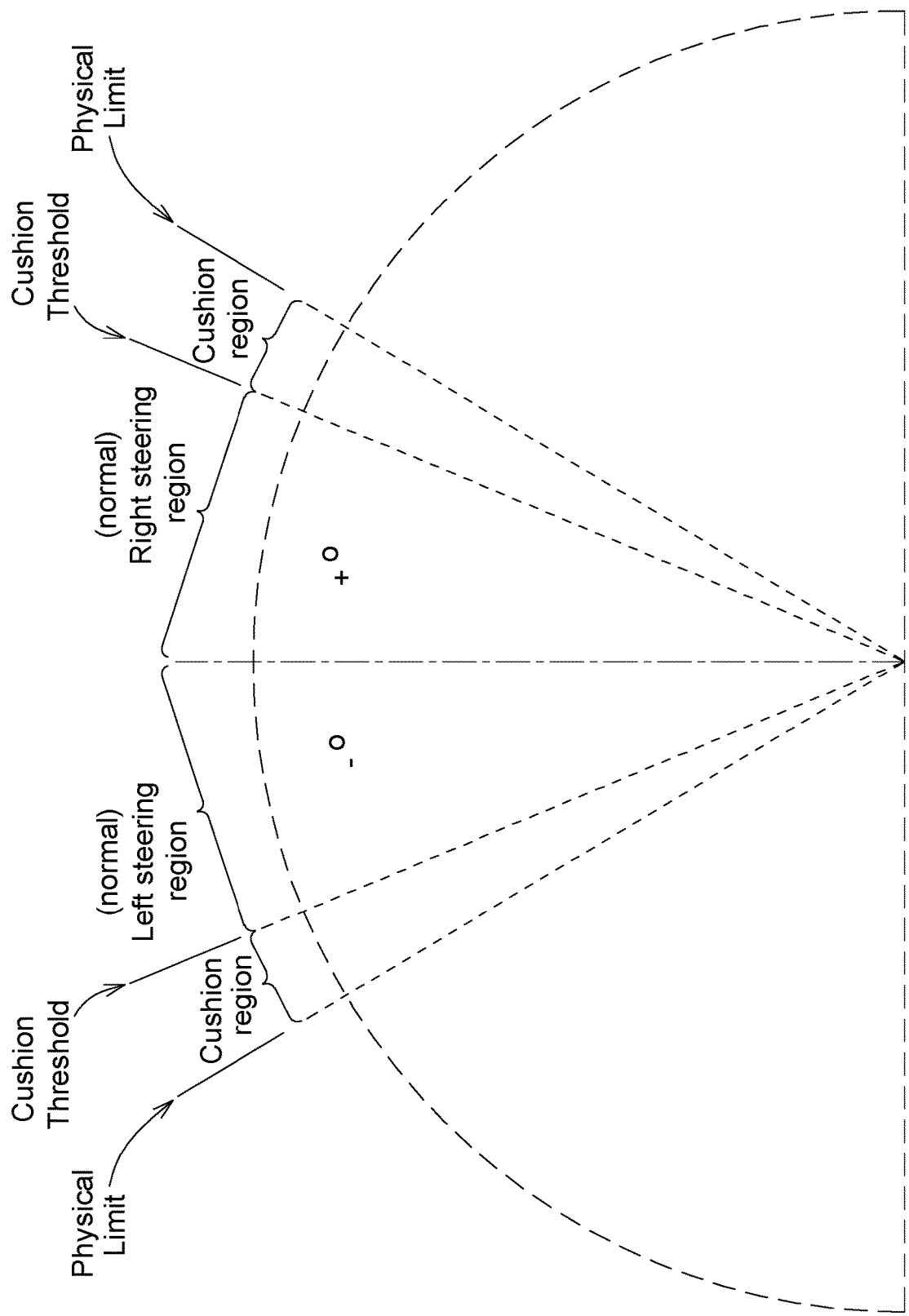
FIG. 2B demonstrates normal steering regions and cushion regions.

The operator control member 282 may include or is coupled to a control valve 42 having a position 422 and a position 424 above the position 422, and a control valve 44 having a position 442 and a position 444 above the position 442. The control valve 42 and the control valve 44 of operator control member 282 are also hydraulically coupled to a pilot source 40 at a connection P1 to receive a pilot signal. When the operator does not maneuver the operator control member 282, as shown in FIG. 3, the pilot source 40 is coupled to the position 422 of the control valve 42 and the position 442 of the control valve 44. The pilot source 40 is blocked by the control valves 42, 44, and therefore the pilot signal does not flow through the pilot neutralizing system 50 to the steering valve 34 to move the steering spool 342 of the steering valve 34. Also with reference to FIG. 2B, the steer left cushion region is near full left articulation (some offset away from steer left physical limit), the steer right cushion region is near full right articulation (some offset away from steer right physical limit), and the steering region is everywhere in between the two cushion regions. Referring to FIG. 3, in normal steering, that means, the articulation position between the first frame portion 222 and the second frame portion 224 is in a steering region instead of a cushion region, the pilot signal flowing from the pilot source 40, through the operator control member 282 to the steering spool 342 (or one end of the steering valve 34) to move the steering spool 342 so as to operate the actuating assembly 36. For example, in normal steering left, the control valve 42 moves downward from the position 422 to position 424 and the pilot signal flows from the pilot source 40 through the control valve 42 to the pilot neutralizing system 50. Since the articulation position is in the steering region, the pilot neutralizing system 50 allows the pilot signal to flow to the steering valve 34 to shift steering spool 342 to position 346 and allow fluid pump 32 to pump fluid to the actuating assembly 36 to steer the machine 20 to the left. When (the joystick of) the operator control member 282 moves from steering left to non-steering position, the control valve 42 move upward from the position 424 to the position 422, and no pilot signal flows to the pilot neutralizing system 50 for steering. Instead, the pilot signal in the steering valve 34, and/or pilot neutralizing system 50 will drain back through the position 422 of the control valve 42 to a reservoir 46. It is noted that the pilot source 40 may pump the pilot from the reservoir 46. With the pilot signal drained back to tank, springs 341 re-center steer spool 342 to position 344, blocking flow from pump 32 to the actuating assembly 36 to stop steering to the left.

When the first frame portion 222 pivots relative to the second frame portion 224 approaching full steer left (cushion region), the pilot signal applied on the left end of the steering valve 34 is neutralized. Similarly, when the first frame portion 222 pivots relative to the second frame portion 224 approaching full steer right (cushion region), the pilot signal applied on the right end of the steering valve 34 is neutralized. Neutralizing the pilot signal either on left or right end of the steering valve 34 overrides the command (a direction of the pilot signal) from the operator control member 282 and re-centers the steering spool 342 which traps hydraulic fluid in the actuating assembly 36. The pilot neutralizing system 50 stops the steering motion before frame to frame contact to provide a cushion and keep from applying load into the frame assembly 22 of the work vehicle 20. Multiple embodiments of the pilot neutralizing system 50 and the pilot neutralizer 52 thereof are introduced later.

In order to provide cushioning prior to frame to frame contact at full left articulation, an indication of articulation position between the first frame portion 222 and the second frame portion 224 is required. The articulation position can be or correlate to an angle between the first frame portion 222 and the second frame portion 224, the extent of retraction and extension of the actuating assembly 36, and distance between the first frame portion 222 and the second frame portion 224, etc. Therefore, an articulation angle sensor, steering cylinder position sensor(s), or proximity sensors/switches, etc. can be used to obtain the articulation position data. The later description uses the articulation angle sensor 72 (shown in FIGS. 4A, 4B) as an example. The pilot neutralizing system 50 also includes or is coupled to a controller 70 (shown in FIG. 4A, 4B) configured to electrically receive a signal indicative of the articulation position between the first frame portion 222 and second frame portion 224. The controller 70 utilizes the articulation position to determine when the machine gets close to full articulation. The region prior to full articulation is referred to as the cushion region. The cushion region is a tunable parameter in the machine software. The cushion region is adequately sized to bring the momentum of the first frame portion 222 and/or second frame portion 224 to a stop prior to frame to frame contact. There is a steer left cushion region prior to full left articulation, and a steer right cushion region prior to full right articulation. The region between the left cushion region and the right cushion region is referred to as the steering region. The pilot neutralizer 52 is electrically coupled to the controller 70 and hydraulically coupled between the operator control member 282 and the steering valve 34 so as to selectively direct the pilot signal to the steering valve 34. When the articulation position between the first frame portion 222 and the second frame portion 224 reaches a cushion region during steering, the pilot neutralizer 52 is one of de-energized and energized (depends on the design, demonstrated later) by the controller 70 to change the direction of the pilot signal to resist the actuating assembly 36 from moving. The embodiments of the pilot neutralizing system 50/pilot neutralizer 52 are provided below.

A. First Embodiment: One Neutralizer for Each Side of the Steering Valve; Default to the Steering Valve Referring to FIGS. 3 and 4A, the pilot neutralizing system 50 is or includes a pilot neutralizer 52. In the left, the pilot neutralizer 52 includes an in port 522 coupled to the control valve 42 of the operator control member 282 and configured for the communication of the pilot signal. The pilot neutralizer 52 includes an out port 524 coupled to left end of the steering valve 34 and configured for the communication of the pilot signal. Similarly, in the right, pilot neutralizer 52 includes an in port 526 coupled to the control valve 44 of the operator control member 282 and configured for the communication of the pilot signal. The pilot neutralizer 52 includes an out port 528 coupled to right end of the steering valve 34 and configured for the communication of the pilot signal. The pilot neutralizer 52 in this embodiment is a manifold so as to have neutralizer units 54, 56 as a single piece; the neutralizer units 54, 56, however, can be two separate pieces in another embodiment. The neutralizer unit 54 includes a first neutralizer 542 coupled to the in port 522 and out port 524; the neutralizer unit 56 includes a third neutralizer 562 coupled to the in port 526 and the out port 528. The first neutralizer 542 and the third neutralizer 562 in this embodiment are on/off 2-position, 3-way solenoid valves. An actuating component 543 of the first neutralizer 542 and an actuating component 563 of the third neutralizer 562 can be de-energized or energized to respectively switch the positions 544, 545 of the first neutralizer 542 and the positions 564, 565 of the third neutralizer 562. The positions 544, 564 may facilitate the pilot signal flowing to downstream components. The position 545, 565 may facilitate the pilot signal draining to reservoir 58.

In this embodiment, the first neutralizer 542 includes a first de-energized port 551, first energized port 552, and first outlet 553. The first de-energized port 551 is coupled to the operator control member 282. The first energized port 552 is coupled to a reservoir 58. The first de-energized port 551 is connected to the first outlet 553 when the first neutralizer 542 is de-energized (default), that is, in this embodiment, a position 544 of the first neutralizer 542 is coupled. The first energized port 552 is connected to the first outlet 553 when the first neutralizer 542 is energized, that is, in this embodiment, a position 545 of the first neutralizer 542 is coupled. Similarly, the third neutralizer 562 includes a third de-energized port 571, a third energized port 572, a third outlet 573. The third de-energized port 571 is coupled to the operator control member 282. The third energized port 572 is coupled to the reservoir 58. The third de-energized port 571 is connected to the third outlet 573 when the third neutralizer 562 is de-energized (default), that is, in this embodiment, a position 564 is coupled. The third energized port 572 is connected to the third outlet 573 when the third neutralizer 562 is energized, that is, in this embodiment, a position 565 is coupled.

Figure 4A:
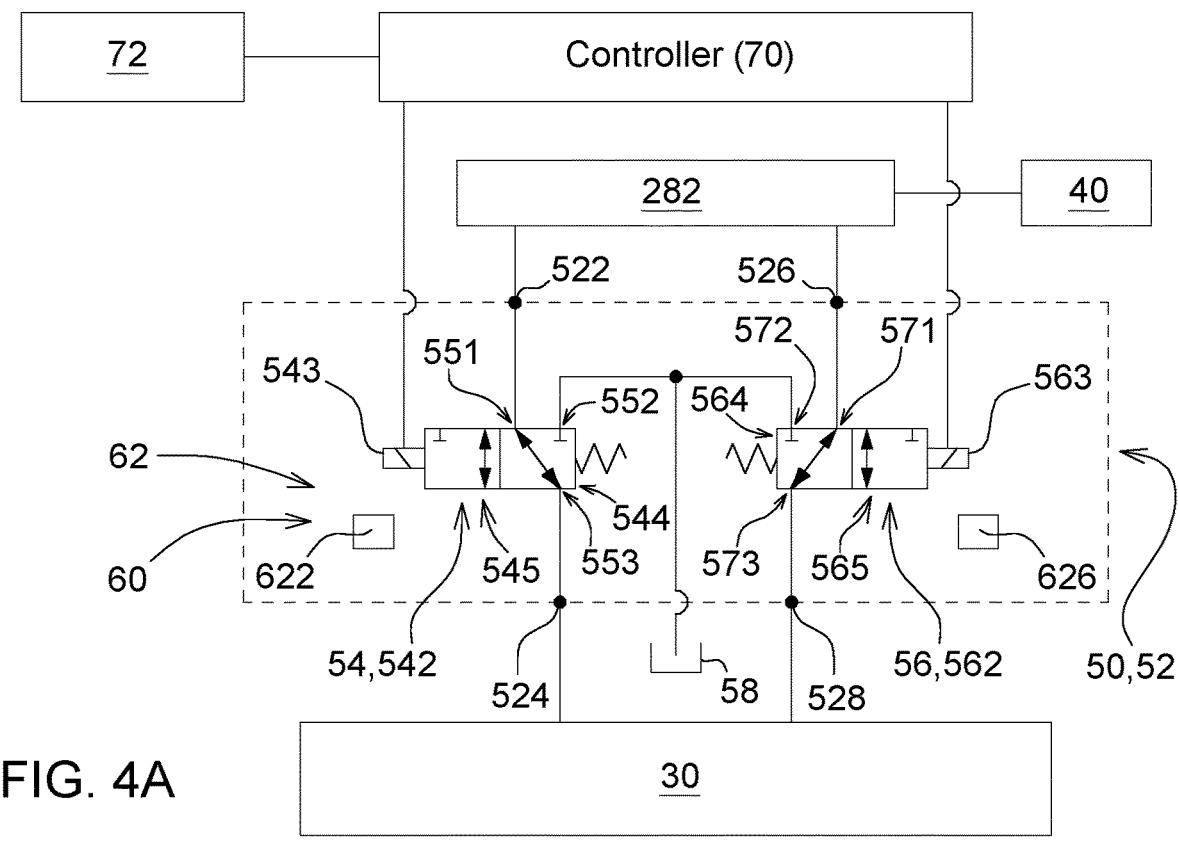
FIG. 4A demonstrates a first embodiment of a pilot neutralizer system.

The articulation angle sensor 72 is configured to detect the angle between the first frame portion 222 and the second frame portion 224. The signal indicative of the articulation position (e.g. angle) is transmitted from the articulation angle sensor 72 to the controller 70 to determine whether the articulation position is within either the steering region or cushion region. While the articulation position is in the steering region, the first neutralizer 542 and the third neutralizer 562 will be de-energized to allow normal steering functionality. That is, the pilot signal transmitted from the operator control member 282 through the first neutralizer 542 or the third neutralizer 562, depending upon the operator steering left or right, to the steering valve 34, as shown in FIGS. 3, 4A. Once the articulation position enters the cushion region, for example, left cushion region, the controller 70 sends electrical signals to energize the first neutralizer 542. When the first neutralizer 542 is energized, the position 545 instead of position 544 is coupled, and the steer left pilot signal from the operator control member 282 is blocked and the steer left pilot signal previously going to the steering valve 34 is connected to the reservoir 58 to disable steering to the left. The third neutralizer 562 remains de-energized to allow the operator to steer to the right and steer out of the steer left cushion region. Once the operator steers to the right and back into the steering region, the electrical signals going to the first neutralizer 542 will be turned off to return the first neutralizer 542 to the de-energized state allowing steering control in both directions once again. Steering right with the right cushion region may have a similar way. Once the articulation position enters right cushion region, the controller 70 sends electrical signals to energize the third neutralizer 562. When the third neutralizer 562 is energized, the position 565 instead of position 564 is coupled, and the steer right pilot signal from the operator control member 282 is blocked and the steer right pilot signal previously going to the steering valve 34 is connected to the reservoir 58 to disable steering to the right. The first neutralizer 542 remains de-energized to allow the operator to steer to the left and steer out of the steer right cushion region. Once the operator steers to the left and back into the steering region, the electrical signals going to the third neutralizer 562 will be turned off to return the third neutralizer 562 to the de-energized state allowing steering control in both directions once again.

The pilot neutralizing system 50 further includes sensors 60 to diagnose incorrectly de-energized or incorrectly energized state of the first neutralizer 542 and the third neutralizer 562. The sensors 60 in this embodiment are position sensors 62, including a first position sensor 622 and a third position sensor 626. The first position sensor 622 detects the positions of the first neutralizer 542 and the third position sensor 626 detects the positions of the third neutralizer 562. The first position sensor 622 can determine whether first neutralizer 542 is incorrectly in de-energized or energized state. Similarly, the third position sensor 626 can determine whether third neutralizer 562 is incorrectly in de-energized or energized state. Take steering to the left for example. When the articulation position is within normal left steering region, and the electric signal going to the first neutralizer 542 is normally turned off. The first position sensor 622 detects the positions 544, 545 of the first neutralizer 542. Ideally in normal left steering region, the position 544 of the first neutralizer 542 should be coupled to the operator control member 282 and to the hydraulic circuit 30, and the first neutralizer 542 is in de-energized state. However, if the first position sensor 622 detects the first neutralizer 542 shifted to the position 545 instead of the position 544, this indicates the first neutralizer 542 is incorrectly in energized state. The indicator 286 which can be a component of the display 284 or a standalone light in the cab 28, for example, indicates such incorrectly energized state. On the contrary, when the articulation position is steered within the left cushion region, and the electric signal going to the first neutralizer 542 is normally turned on. The first position sensor 622 detects the positions of the first neutralizer 542 and ideally, the position 545 connects the operator control member 282 and the hydraulic circuit 30. However, if the first position sensor 622 detects the first neutralizer 542 shifted to the position 544 instead of the position 545, this indicates the first neutralizer 542 is incorrectly in de-energized state. The indicator 286 indicates the first neutralizer 542 is incorrectly in de-energized state. Steering to the right, with the third positions sensor 626, may be operated in a mirror fashion and the description is omitted for succinctness.

Figure 4B:
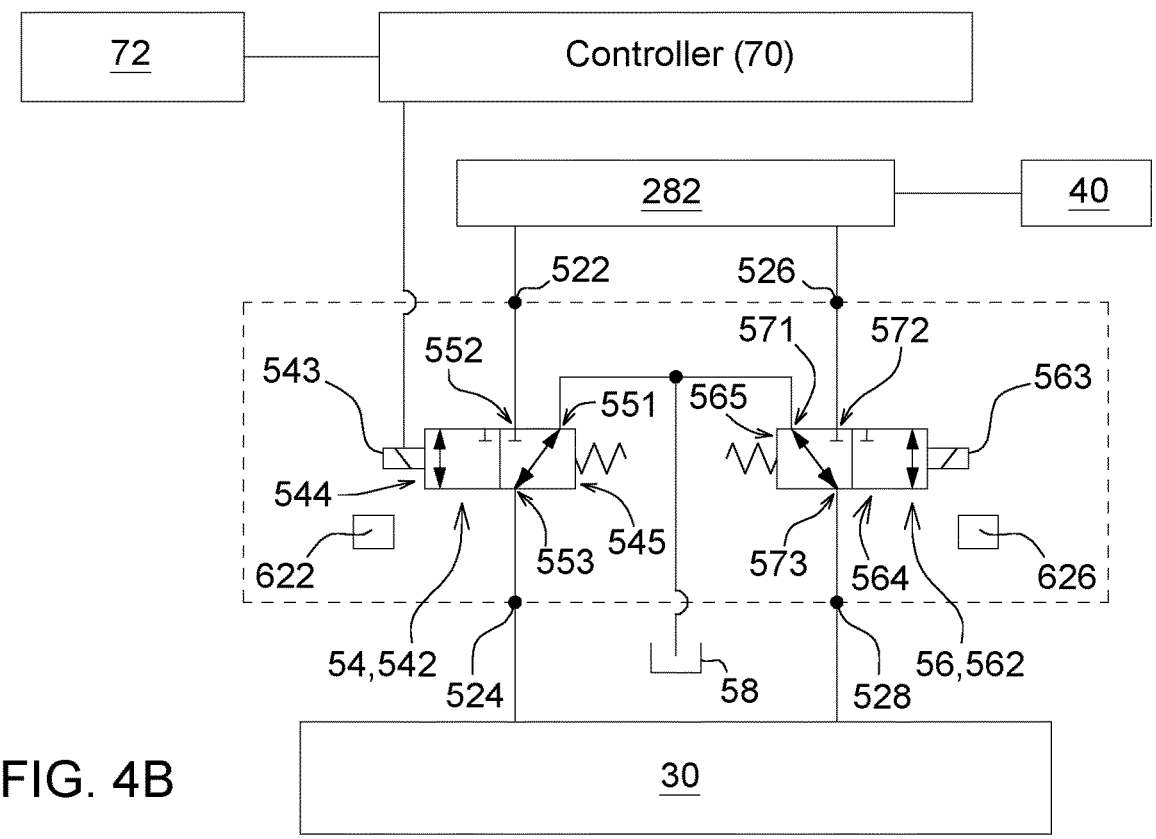
FIG. 4B demonstrates a second embodiment of a pilot neutralizer system.

B. Second Embodiment: One Neutralizer for Each Side of the Steering Valve; Default to Steering Valve Referring to FIGS. 3 and 4B, compared with the first embodiment, the positions 544, 545 of the first neutralizer 542 exchange and the positions 564,565 of the third neutralizer exchange. Therefore, in this embodiment, the first de-energized port 551 defaults to be coupled to the reservoir 58. The first energized port 552 defaults to be coupled to the operator control member 282. The first de-energized port 551 is connected to the first outlet 553 when the first neutralizer 542 is de-energized (default), that is, the position 545 of the first neutralizer 542 is coupled. The first energized port 552 is connected to the first outlet 553 when the first neutralizer 542 is energized, that is, a position 544 of the first neutralizer 542 is coupled. Similarly, the third de-energized port 571 defaults to be coupled to the reservoir 58. The third energized port 572 defaults to be coupled to the operator control member 282. The third de-energized port 571 is connected to the third outlet 573 when the third neutralizer 562 is de-energized (default), that is, the position 565 is coupled. The third energized port 572 is connected to the third outlet 573 when the third neutralizer 562 is energized, that is, the position 564 is coupled.

While the articulation position is in the steering region, the first neutralizer 542 and the third neutralizer 562 will be energized to allow normal steering functionality. That is, the pilot signal transmitted from the operator control member 282 through the first neutralizer 542 or the third neutralizer 562, depending upon the operator steering left or right, to the steering valve 34. Once the articulation position enters the cushion region, for example, left cushion region, the controller 70 changes electrical signals (or turns off the electrical signal) to de-energize the first neutralizer 542. When the first neutralizer 542 is de-energized, the position 545 instead of position 544 is coupled, and the steer left pilot signal from the operator control member 282 is blocked and the steer left pilot signal previously going to the steering valve 34 is connected to the reservoir 58 to disable steering to the left. The third neutralizer 562 remains energized to allow the operator to steer to the right and steer out of the steer left cushion region. Once the operator steers to the right and back into the steering region, the electrical signals going to the first neutralizer 542 will be turned on (or sends electrical signals) to return the first neutralizer 542 to the energized state allowing steering control in both directions once again. Steering right with the right cushion region may have a similar way. Once the articulation position enters right cushion region, the controller 70 changes electrical signals (or turn off the electrical signal) to de-energize the third neutralizer 562. When the third neutralizer 562 is de-energized, the position 565 instead of position 564 is coupled, the steer right pilot signal from the operator control member 282 is blocked and the steer right pilot signal previously going to the steering valve 34 is connected to the reservoir 58 to disable steering to the right. The first neutralizer 542 remains energized to allow the operator to steer to the left and steer out of the steer right cushion region. Once the operator steers to the left and back into the steering region, the electrical signals going to the third neutralizer 562 will be turned on (or sends electrical signals) to return the third neutralizer 562 to the energized state allowing steering control in both directions once again.

Similar to the first embodiment, the pilot neutralizing system 50 further includes the sensors 60 to diagnose the incorrectly de-energized or incorrectly energized states of the first neutralizer 542 and the third neutralizer 562. The sensors 60 in this embodiment are the position sensors 62, including the first position sensor 622 and the third position sensor 626. Take steering to the left for example. When the articulation position is within normal left steering region, and the electric signal going to the first neutralizer 542 is normally turned on. The first position sensor 622 detects the positions 544, 545 of the first neutralizer 542. Ideally in normal left steering region, the position 544 of the first neutralizer 542 should be coupled to the operator control member 282 and to the hydraulic circuit 30, and the first neutralizer 542 is in energized state. However, if the first position sensor 622 detects the first neutralizer 542 shifted to the position 545 instead of the position 544, this indicates the first neutralizer 542 is incorrectly in de-energized state. The indicator 286 indicates such incorrectly de-energized state. On the contrary, when the articulation position is steered within the left cushion region, and the electric signal going to the first neutralizer 542 is normally turned off (or the electrical signal is used to de-energize the first neutralizer 542). The first position sensor 622 detects the positions of the first neutralizer 542 and ideally, the position 545 connects the operator control member 282 and the hydraulic circuit 30. However, if the position sensor 622 detects the first neutralizer 542 shifted to the position 544 instead of the position 545, this indicates the first neutralizer 542 is incorrectly in energized state. The indicator 286 indicates the incorrectly energized state of the first neutralizer 542. Steering to the right may be operated in a mirror fashion and the description is omitted for succinctness.

The first and the second embodiments introduce the neutralizer unit 54 having a single solenoid valve (first neutralizer 542) and the neutralizer unit 56 having a single solenoid valve (third neutralizer 562). However, each of the neutralizer units 54, 56 can have one or more than one neutralizer and those neutralizers can be coupled in multiple ways. The neutralizer units 54,56 having more than one neutralizer may provide additional redundancy and potential diagnostic coverage.

C. Third to Fifth Embodiments: Multiple Neutralizers in a Parallel Arrangement for Each Side of the Steering Valve; Default to the Steering Valve As to the third embodiment, with reference with FIG. 5A, the neutralizer unit 54 has a first neutralizer 542 and a second neutralizer 546 coupled to the first neutralizer 542 in a parallel arrangement, and the neutralizer unit 56 has a third neutralizer 562 and a fourth neutralizer 566 coupled to the third neutralizer 562 in a parallel arrangement. The first neutralizer 542 in this embodiment is similar to the first neutralizer 542 in the first embodiment; the third neutralizer 562 in this embodiment is similar to the third neutralizer 562 in the first embodiment. The second neutralizer 564 is similar to the first neutralizer 542 and has an actuating component 547, positions 548, 549, and a second de-energized port 556, a second energized port 557, and a second outlet 558 applied to the positions 548, 549. The fourth neutralizer 566 is similar to the third neutralizer 562 and has an actuating component 567, positions 568, 569, and a fourth de-energized port 576, a fourth energized port 577, and a fourth outlet 578 applied to the positions 548, 549.

The pilot neutralizer 52 includes a shuttle valve 559 coupled to the out port 524, and the first neutralizer 542 and the second neutralizer 546 are in a parallel arrangement and coupled to the shuttle valve 559. The shuttle valve 549 is located downstream of the first and second outlets 553, 558 of the first neutralizer 542 and the second neutralizer 546 and configured to connect the higher pressure of the first neutralizer 542 and the second neutralizer 546 to the out port 524.

Take steering to the left for example. When steer left is commanded by the operator, the steer left pilot signal from the operator control member 282 enters the pilot neutralizer 52, which is a manifold, at in port 522. Steer left pilot signal is connected to the first and second de-energized ports 551, 556 or the first and second energized ports 552, 557. When the articulation position between the first frame portion 222 and the second frame portion 224 is within a steering region, the first neutralizer 542 is de-energized (position 544 in this embodiment) for the pilot signal flowing from the operator control member 282 to the shuttle valve 559, and the second neutralizer 546 is de-energized (position 548 in this embodiment) for the pilot signal flowing from the operator control member 282 to the shuttle valve 559. The shuttle valve 559 will connect the higher pilot signal between the first neutralizer 542 and second neutralizer 546 outlets to the out port 524 and to one end of steering spool 342. It is noted that the difference in pressure between the pilot signal flowing from the first neutralizer 542 and the second neutralizer 546 may be substantially small due to different restrictions in their flow paths. Then the pilot signal shifts the steering spool 342 and therefore steers the work vehicle 20 to the left. When the operator returns the operator control member 282 to neutral to stop steering to the left, the steer left pilot signal at the steering valve 34 can drain back through the shuttle valve 559, then through the first neutralizer 542 and the second neutralizer 546, and finally through the operator control member 282 back to the reservoir 46 (shown in FIG. 3). Since the first neutralizer 542 and the second neutralizer 546 default to the first and second outlets 553, 558 connected to the first and second de-energized ports 551, 556, the steering continues to function normally with a loss of electrical power/signal to the first neutralizer 542 or the second neutralizer 546.

When the articulation position between the first frame portion 222 and the second frame portion 224 is within the left cushion region, the controller 70 sends electrical signals to energize the first neutralizer 542 (shifts to the position 545) and the second neutralizer 546 (shifts to the position 549). The steer left pilot signal from the operator control member 282 is blocked by the first de-energized port 551 and the second de-energized port 556, due to the position 545, 549, and the pilot signal drains back from the steering spool 342 through the first and second outlets 553, 558, and through the first and second energized ports 552, 557 to the reservoir 58, and therefore disable steering to the left. The third neutralizer 562 and fourth neutralizer 566 remain de-energized to allow the operator to steer to the right and steer out of the left cushion region. Once the operator steers to the right and back into the steering region, the electrical signals going to the first neutralizer 542 and 546 will be turned off to return the first neutralizer 542 and the second neutralizer 546 to the de-energized state allowing steering control in both directions once again. Steering to the right may be operated in a mirror fashion and the description is omitted for succinctness.

In this embodiment, each of the neutralizer unit 54 and the neutralizer unit 56 includes two neutralizers for redundancy. The design allows for a single point failure to one of the first neutralizer 542 and the second neutralizer 546 (or one of the third neutralizer 562 and the fourth neutralizer 566) to be absorbed without the loss of steering in either direction. For instance, if the first neutralizer 542 is incorrectly in the energized state, steering control will not be lost. When in the steering region, output pressure of the pilot signal from the first neutralizer 542 will be connected to the reservoir 58 due to being incorrectly in the energized state but output pressure of the pilot signal from the second neutralizer 546 will still match the steer left pilot pressure from the operator control member 282 since the second neutralizer 546 is functioning correctly. The higher output pressure of the first neutralizer 542 or the second neutralizer 546 will be communicated to the steering valve 34, and when left steer is commanded, the left steer pilot pressure from the operator control member 282 will be communicated to the steering valve 34 via the second neutralizer 546. Cushioning functionality will continue to work because the first neutralizer 542 is incorrectly in the energized state and the second neutralizer 546 is energized by the controller 70. Since both normal steering and cushioning still works as intended with one of the first neutralizer 542 and second neutralizer 546 incorrectly in the energized state, diagnostic coverage, which will be described later, can to be added to provide feedback to the operator that a loss of redundancy occurred. If the first neutralizer 542 is instead incorrectly in the de-energized state, the steering control will be normal since the first neutralizer 542 is in the de-energized state. Nonetheless, the steer left cushioning functionality will be disabled. This is because when the articulation position between the first frame portion 222 and the second frame portion 224 enters the steer left cushion region, the second neutralizer 546 will be in the energized state but the first neutralizer 542 will remain in the de-energized state.

An explanatory table 1.1 summarizes the above description that when steering to the left, the status of the first and second neutralizers 542, 546 affecting the normal steer left functionality and steer left cushion functionality. It is noted that "Functioning Properly" designated in the table means the first or second neutralizers 542, 546 can be properly energized and de-energized.

TABLE 1.1

| First Neutralizer Status | Second Neutralizer Status | Normal Steer Left Functionality | Steer Left Cushion Functionality |
|---|---|---|---|
| Functioning Properly | Functioning Properly | Functioning Properly | Functioning Properly |
| Incorrectly in De-energized State | Functioning Properly | Functioning Properly | Disabled |
| Incorrectly in Energized State | Functioning Properly | Functioning Properly | Functioning Properly |
| Functioning Properly | Incorrectly in De-energized State | Functioning Properly | Disabled |
| Functioning Properly | Incorrectly in Energized State | Functioning Properly | Functioning Properly |

An explanatory table 1.2 illustrates a mirror fashion that when steering to the right, the status of the third and fourth neutralizers 562, 566 affecting the normal steer right functionality and steer right cushion functionality.

TABLE 1.2

| Third Neutralizer Status | Fourth Neutralizer Status | Normal Steer Right Functionality | Steer Right Cushion Functionality |
|---|---|---|---|
| Functioning Properly | Functioning Properly | Functioning Properly | Functioning Properly |
| Incorrectly in De-energized State | Functioning Properly | Functioning Properly | Disabled |
| Incorrectly in Energized State | Functioning Properly | Functioning Properly | Functioning Properly |
| Functioning Properly | Incorrectly in De-energized State | Functioning Properly | Disabled |
| Functioning Properly | Incorrectly in Energized State | Functioning Properly | Functioning Properly |

The diagnostic coverage can also provide a feedback to the operator that a loss of redundancy occurred. The diagnostic coverage is described below.

Figure 5A:
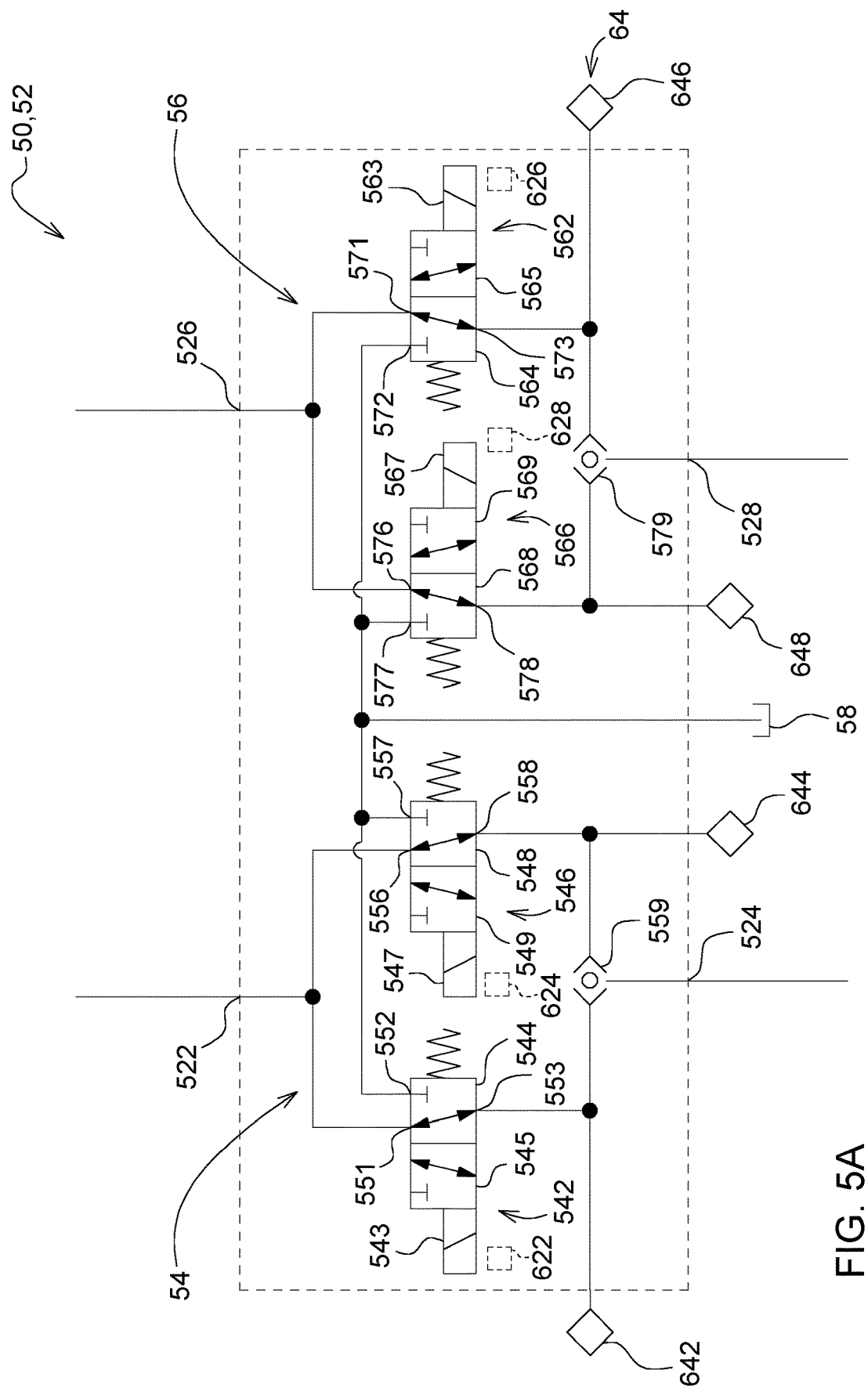
FIG. 5A demonstrates a third embodiment of a pilot neutralizer system.

In this embodiment, diagnostic coverage can be obtained by pressure sensors 64, including a first pressure sensor 642 coupled between the first neutralizer 542 and the shuttle valve 559, a second pressure sensor 644 coupled between the second neutralizer 546 and the shuttle valve 559, a third pressure sensor 646 coupled between the third neutralizer 562 and the shuttle valve 579, and a fourth pressure sensor 648 coupled between the fourth neutralizer 566 and the shuttle valve 579 as shown in FIG. 5A. The first pressure sensor 642 detects a pressure of the pilot signal responsive to the first neutralizer 542 as the first value, the second pressure sensor 644 detects a pressure of the pilot signal responsive to the second neutralizer 546 as the second value, the third pressure sensor 646 detects a pressure of the pilot signal responsive to the third neutralizer 562 as the third value, the fourth pressure sensor 648 detects a pressure of the pilot signal responsive to the fourth neutralizer 566 as the fourth value.

Take steering to the left for an example. No matter the articulation position is in the steering region or cushion, the pressure of the pilot signal in the first neutralizer 542 (first value) and the pressure of the pilot signal in the second neutralizer 546 (second value) is supposed to be substantially equal to/match each other. If they do not match, then there is an issue associated with the first neutralizer 542 or the second neutralizer 546. Checking how they match can be done one of two ways:

1) If first value and the second value differ greater than X psi for a period of time Z, where X and Z are adequately sized to reliably detect the first neutralizer 542 or second neutralizer 546 incorrectly in energized state or incorrectly in de-energized state while avoiding false result.

2) If one sensor is less than M psi and the other sensor is greater than N psi for a period of time Z, where N>=M, and where M, N, and Z are adequately sized to reliably detect the first neutralizer 542 or second neutralizer 546 incorrectly in energized state or incorrectly in de-energized state while avoiding false result.

When the articulation position between the first frame portion 222 and the second frame portion 224 is within the steering region, the first neutralizer 542 is de-energized for the pilot signal flowing from the operator control member 282 to the shuttle valve 559, and the second neutralizer 546 is de-energized for the pilot signal flowing from the operator control member 282 to the shuttle valve 559. One of the first value (related to the first neutralizer 542 and obtained by the first pressure sensor 642) and the second value (related to the second neutralizer 546 and obtained by the second pressure sensor 644) which is substantially lower than the other, with the period of time as described above, indicates that one of the first neutralizer 542 and second neutralizer 546 that has a lower value is incorrectly in the energized state. The indicator 286 (not shown in FIG. 5A) may indicate which neutralizer has the lower value and/or incorrectly in the energized state.

When the articulation position between the first frame portion 222 and the second frame portion 224 is within the cushion region, the first neutralizer 542 and the second neutralizer 546 are energized for the pilot signal draining back from the steering valve 34. One of the first value and the second value which is substantially higher than the other indicates that one of the first neutralizer 542 and second neutralizer 546 that has a higher value is incorrectly in the de-energized state. The indicator 286 (not shown in FIG. 5A) may indicate which neutralizer has the higher value and/or incorrectly in the de-energized state. Alternatively, it may not need to compare the first value and the second value to check whether one of the first neutralizer 542 and the second neutralizer 546 functioning properly, when the articulation position between the first frame portion 222 and the second frame portion 224 is within the cushion region. The first value detected by first pressure sensor 642 and the second value detected by second pressure sensor 644 may be directly used for checking. If functioning properly, both of the first neutralizer 542 and second neutralizer 546 are energized and therefore the first value and the second value should be low. If the first value is high (substantially higher than zero), this means the first neutralizer 542 may be incorrectly in de-energized state. Likewise, if the second value is high (substantially higher than zero), this means that the second neutralizer 546 may be incorrectly in de-energized state.

Therefore, when steering to the left, in the steering or cushion region, the diagnostic coverage can be obtained by the first and second pressure sensors 642, 644.

A table 1.3 summarizes the above description that when steering to the left, the first value (related to the first neutralizer 542) and the second value (related to the second neutralizer 546) are compared (within steering region or cushion region) to diagnose whether the first neutralizer 542 and the second neutralizer 546 are functioning properly (without being incorrectly in de-energized state nor in energized state.) The diagnostic coverage is used to detect single point failure for the first or second neutralizer 542, 546.

TABLE 1.3

| Steering State | First Value = Second Value | First Value > Second Value | First Value < Second Value |
|---|---|---|---|
| Steering Region | First neutralizer and Second neutralizer De-energized | Second neutralizer incorrectly in energized state | First neutralizer incorrectly in energized state |
| Cushion Region | First neutralizer and Second neutralizer Energized | First neutralizer incorrectly in de-energized state | Second neutralizer incorrectly de-energized state |

Similarly, with respect to steering to the right, the third pressure sensor 646 and fourth pressure sensor 648 coupled to the neutralizer unit 56 has mirror fashion. A table 1.4 demonstrates that when steering to the right, the third value (related to the third neutralizer 562) and the fourth value (related to the fourth neutralizer 566) are compared, with reference to the articulation position (within steering region or cushion region) to diagnose whether the third neutralizer 562 and the fourth neutralizer 566 are working (without being incorrectly in de-energized nor energized state.) The diagnostic coverage is used to detect single point failure for the third or fourth neutralizer 562, 566.

TABLE 1.4

| Steering State | Third Value = Fourth Value | Third Value > Fourth Value | Third Value < Fourth Value |
|---|---|---|---|
| Steering Region | Third neutralizer and Fourth neutralizer De-energized | Fourth neutralizer incorrectly in energized state | Third neutralizer incorrectly in energized state |
| Cushion Region | Third neutralizer and Fourth neutralizer Energized | Third neutralizer incorrectly in de-energized state | Fourth neutralizer incorrectly in de-energized state |

Figure 5B:
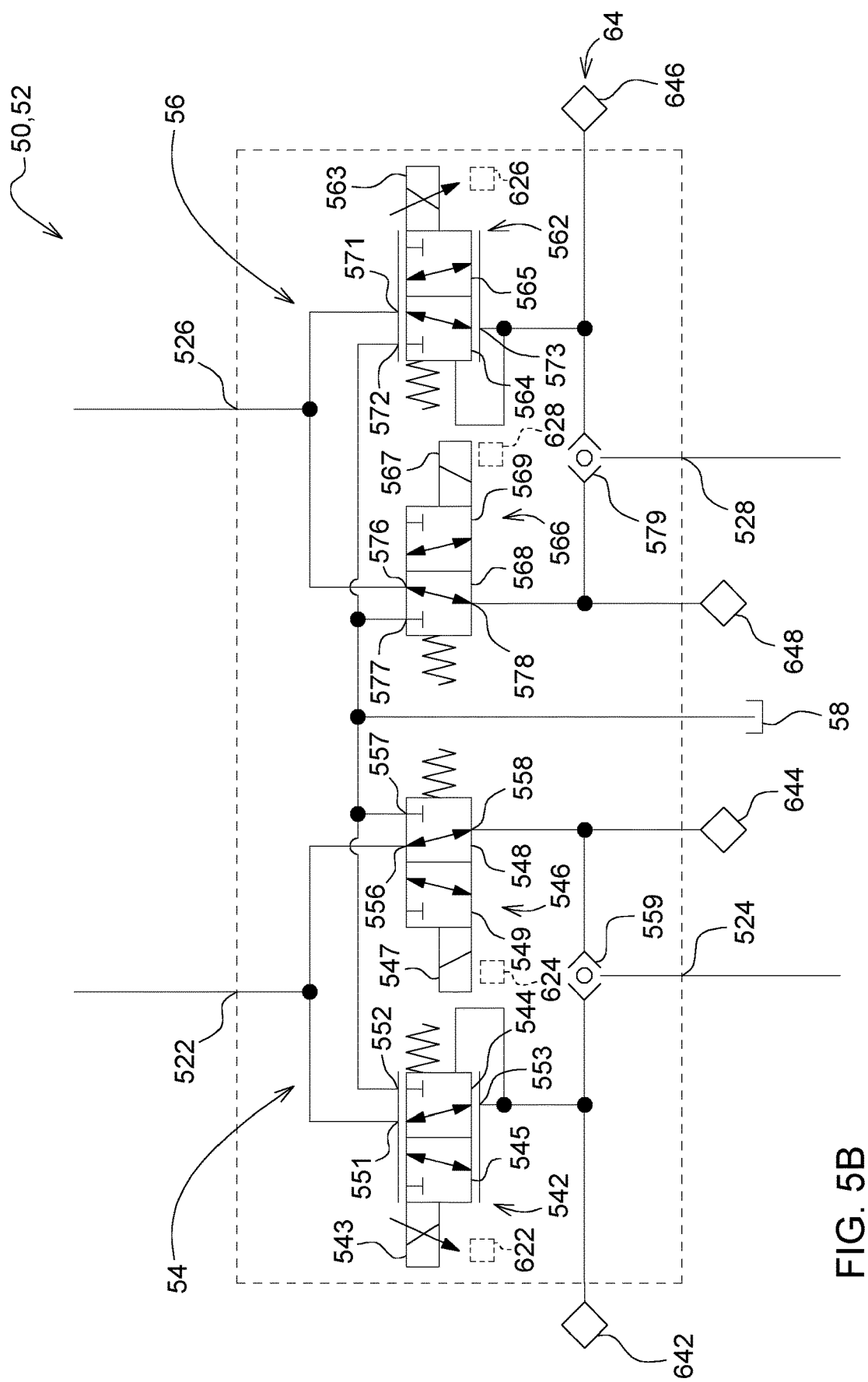
FIG. 5B demonstrates a fourth embodiment of a pilot neutralizer system.

As to the fourth embodiment, with reference to FIG. 5B, one of the first neutralizer 542 and the second neutralizer 546, and one of the third neutralizer 562 and the fourth neutralizer 566 are proportional pressure reducing (solenoid) valves with default to maximum pressure output. In this embodiment, the first neutralizer 542 and the third neutralizer 562 are the proportional pressure reducing valves, and the second neutralizer 546 and the fourth neutralizer 566 are on/off solenoid valve. Having one neutralizer (first neutralizer 542/second neutralizer 546) of the neutralizer unit 54 and one neutralizer (third neutralizer 562/fourth neutralizer 566) of the neutralizer unit 56 as proportional pressure reducing valves allows for progressive cushion control. Instead of having the steering neutralized abruptly in an on/off fashion, the pilot signal/command to the proportional solenoid valves can be ramped on to gradually decrease the steer left or steer right pilot pressure. The gradual reduction in steer left or steer right pilot pressure will ease the steering to a stop allowing for a smoother operation for the operator. With proportional pressure reducing (solenoid) valves with default to maximum pressure output, at zero command to the solenoid there will be no reduction in input pilot pressure at the output. At full command to the solenoid the output pressure will be reduced to minimum output. Therefore, with the loss of electrical power, the proportional pressure reducing (solenoid) valves with default to maximum pressure output will default to no reduction in steering pilot pressure.

Figure 5C:
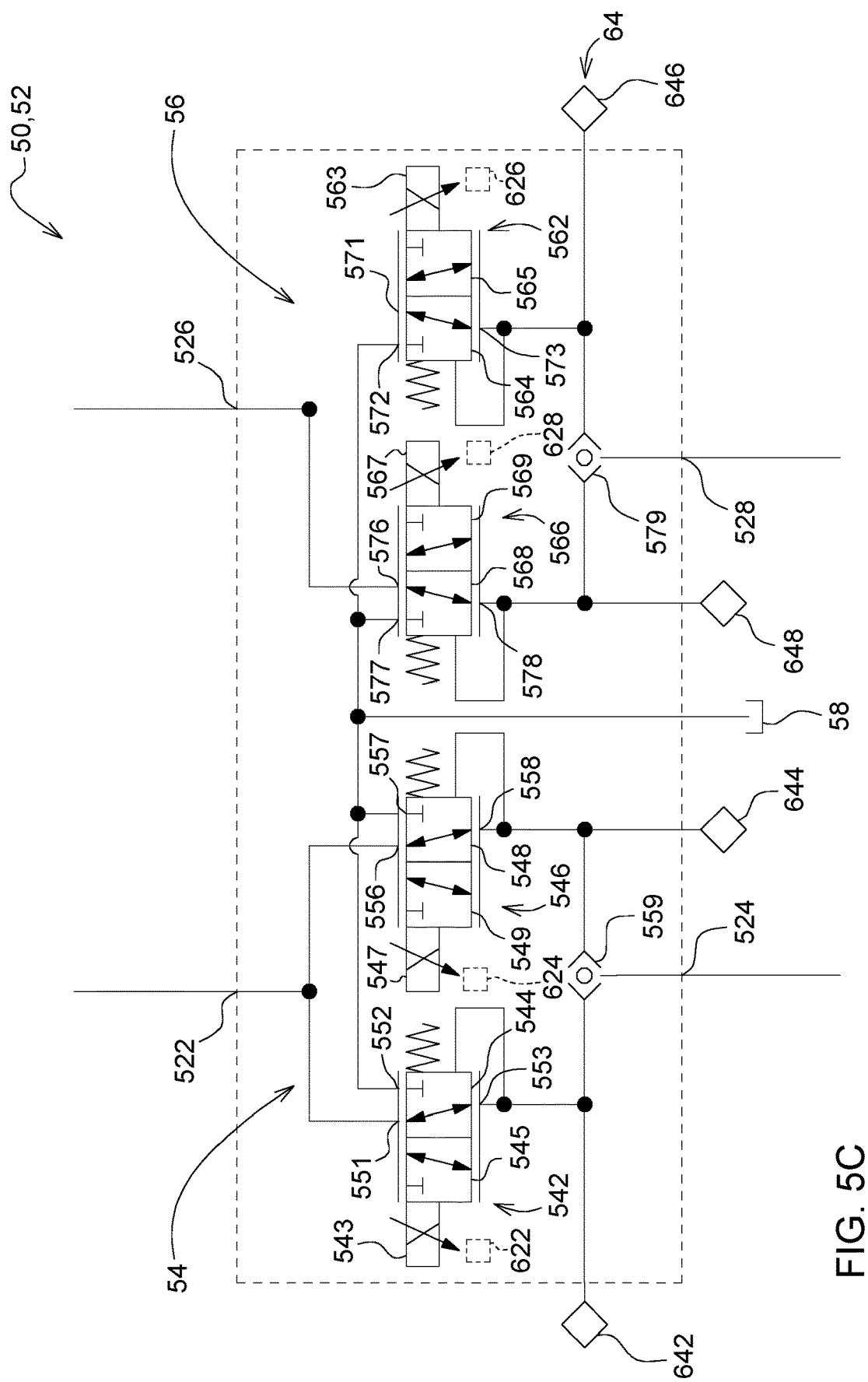
FIG. 5C demonstrates a fifth embodiment of a pilot neutralizer system.

As to the fifth embodiment, with reference to FIG. 5C, the first neutralizer 542, the second neutralizer 546, the third neutralizer 562, and the fourth neutralizer 566 are proportional pressure reducing (solenoid) valves with default to maximum pressure output.

It is noted that the pilot neutralizing system 50 may alternatively include position sensors 62 to diagnose incorrectly de-energized or incorrectly energized state of the first neutralizer 542, the second neutralizer 546, the third neutralizer 562, and the fourth neutralizer 566. The position sensors 62, for example, may detect the positions of actuators of the neutralizers. As shown in FIGS. 5A-5C, the position sensors 62 include a first position sensor 622, a second position sensor 624, a third position sensor 626, and a fourth position sensor 628. The first position sensor 622 detects the positions of the first neutralizer 542, the second position sensor 624 detects the positions of the second neutralizer 546, the third position sensor 626 detects the positions of the third neutralizer 562, and the fourth position sensor 628 detects the positions of the fourth neutralizer 566. As described in the first and second embodiments, the position sensor 62 can determine whether the neutralizers are incorrectly in de-energized or energized state.

Figure 6A:
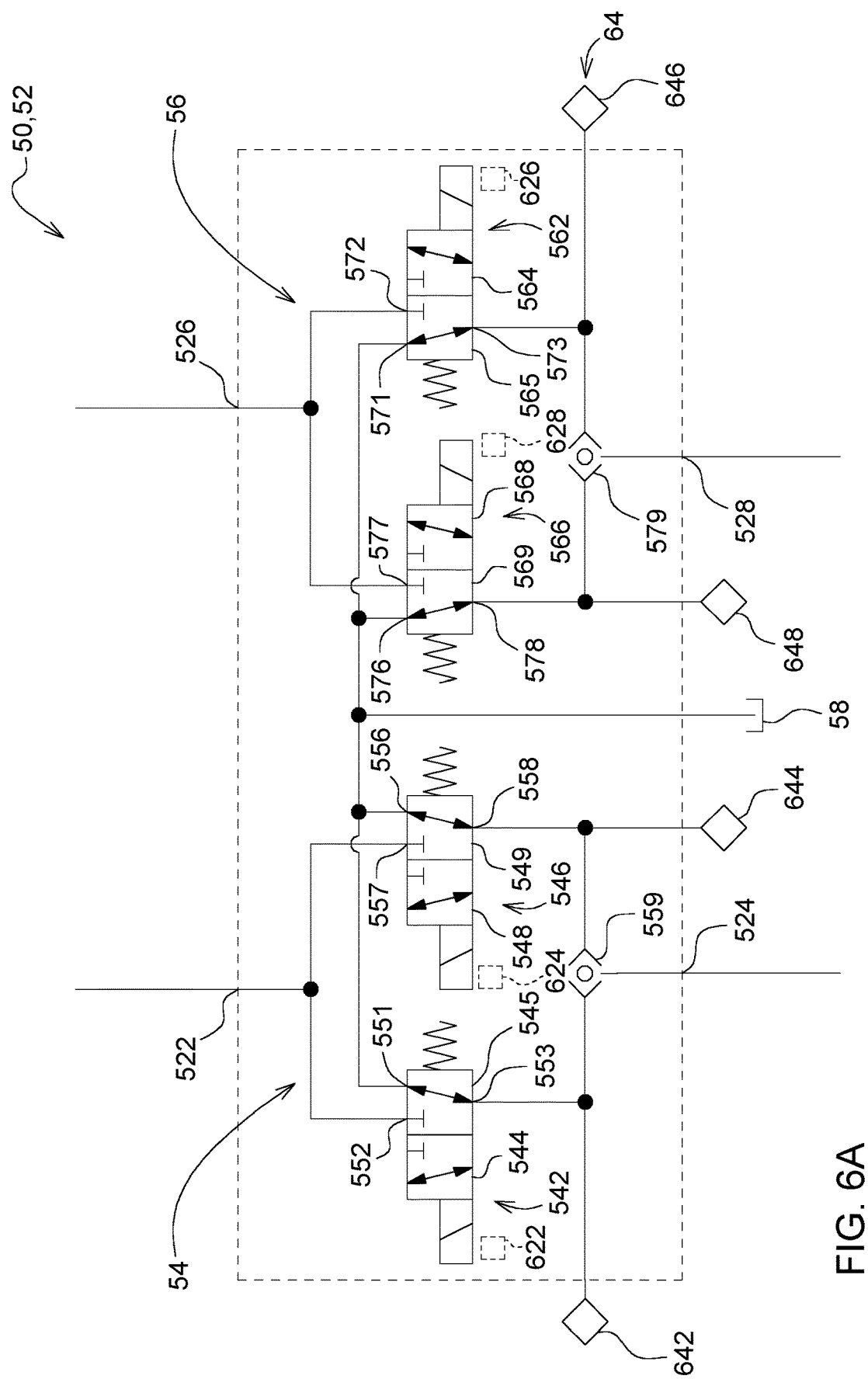
FIG. 6A demonstrates a sixth embodiment of a pilot neutralizer system.

D. Sixth to Eighth Embodiments: Multiple Neutralizers in a Parallel Arrangement for Each Side of the Steering Valve; Default to the Reservoir As to the sixth embodiment, with reference to FIG. 6A, the pilot neutralizing system 50 is similar to that in the third embodiment, except it defaults to the reservoir 58, and the positions of the first to the fourth neutralizer 542, 546, 562, 566 exchange.

Take steering to the left for example. When steer left is commanded by the operator, the steer left pilot signal from the operator control member 282 enters the pilot neutralizer 52, which is a manifold, at in port 522. Steer left pilot signal is connected to the first and second de-energized ports 551, 556 or the first and second energized ports 552, 557. When the articulation position between the first frame portion 222 and the second frame portion 224 is within a steering region, the first neutralizer 542 is energized (shift to the position 544) for the pilot signal flowing from the operator control member 282 to the shuttle valve 559, and the second neutralizer 546 is energized (shift to the position 548) for the pilot signal flowing from the operator control member 282 to the shuttle valve 559. The shuttle valve 559 will connect the higher pilot signal between the first neutralizer 542 and second neutralizer 546 outlets to the out port 524 and to one end of steering spool 342. Then the pilot signal shifts the steering spool 342 and therefore steers the work vehicle 20 to the left. When the operator returns the operator control member 282 to neutral to stop steering to the left, the steer left pilot signal at the steering valve 34 can drain back through the shuttle valve 559, then through the first neutralizer 542 and the second neutralizer 546, and finally through the operator control member 282 back to the reservoir 46 (as shown in FIG. 3). Since the first neutralizer 542 and the second neutralizer 546 default to the first and second outlets 553, 558 connected to the first and second de-energized ports 551, 556, steering within steering region with the first neutralizer 542 powered to shift to the position 544, and/or with the second neutralizer 546 powered to shift to the position 548, such that the pilot signal can flow to the steering spool 342.

When the articulation position between the first frame portion 222 and the second frame portion 224 is within the left cushion region, the controller 70 changes electrical signals to de-energize or stop powering the first neutralizer 542 (shifts back to the position 545) and the second neutralizer 546 (shifts back to position 549). The steer left pilot signal from the operator control member 282 is blocked by the port 552 and the second energized port 557, and the pilot signal drains back from the steering spool 342 through the first outlet 553, the first de-energized port 551, to the reservoir 58 or from the steering spool 342 through the second outlet 558, the second de-energized port 556, to the reservoir 58. Therefore, steering to the left is disabled. The third neutralizer 562 and fourth neutralizer 566 remain energized to allow the operator to steer to the right and steer out of the left cushion region. Once the operator steers to the right and back into the steering region, the electrical signals going to the first neutralizer 542 and 546 will be turned on to return the first neutralizer 542 and the second neutralizer 546 to the energized state allowing steering control in both directions once again. Steering to the right may be operated in a mirror fashion and the description is omitted for succinctness. The redundancy is similar to the third embodiment and an explanatory table 2.1 demonstrates that when steering to the left, the status of the first and second neutralizers 542, 546 affecting the normal steer left functionality and steer left cushion functionality.

TABLE 2.1

| First Neutralizer Status | Second Neutralizer Status | Normal Steer Left Functionality | Steer Left Cushion Functionality |
|---|---|---|---|
| Functioning Properly | Functioning Properly | Functioning Properly | Functioning Properly |
| Incorrectly in De-energized State | Functioning Properly | Functioning Properly | Functioning Properly |
| Incorrectly in Energized State | Functioning Properly | Functioning Properly | Disabled |
| Functioning Properly | Incorrectly in De-energized State | Functioning Properly | Functioning Properly |
| Functioning Properly | Incorrectly in Energized State | Functioning Properly | Disabled |

An explanatory table 2.2 illustrates a mirror fashion that when steering to the right, the status of the third and fourth neutralizers 562, 566 affecting the normal steer right functionality and steer right cushion functionality.

TABLE 2.2

| Third Neutralizer Status | Fourth Neutralizer Status | Normal Steer Right Functionality | Steer Right Cushion Functionality |
|---|---|---|---|
| Functioning Properly | Functioning Properly | Functioning Properly | Functioning Properly |
| Incorrectly in De-energized State | Functioning Properly | Functioning Properly | Functioning Properly |
| Incorrectly in Energized State | Functioning Properly | Functioning Properly | Disabled |
| Functioning Properly | Incorrectly in De-energized State | Functioning Properly | Functioning Properly |
| Functioning Properly | Incorrectly in Energized State | Functioning Properly | Disabled |

This embodiment also includes the diagnostic coverage, like the third embodiment, that can provide a feedback to the operator that a loss of redundancy occurred. When the articulation position between the first frame portion 222 and the second frame portion 224 is within the steering region, the first neutralizer 542 is energized for the pilot signal flowing from the operator control member 282 to the shuttle valve 559, and the second neutralizer 546 is energized for the pilot signal flowing from the operator control member 282 to the shuttle valve 559. One of the first value (related to the first neutralizer 542 and obtained by the first pressure sensor 642) and the second value (related to the second neutralizer 546 and obtained by the second pressure sensor 644) which is substantially lower than the other, with the period of time as described before, indicates that one of the first neutralizer 542 and second neutralizer 546 that has a lower value is incorrectly in the de-energized state.

When the articulation position between the first frame portion 222 and the second frame portion 224 is within the cushion region, the first neutralizer 542 and the second neutralizer 546 are de-energized for the pilot signal draining back from the steering valve 34. One of the first value and the second value which is substantially higher than the other indicates that one of the first neutralizer 542 and second neutralizer 546 that has a higher value is incorrectly in the energized state. Alternatively, it may not need to compare the first value and the second value to check whether one of the first neutralizer 542 and the second neutralizer 546 functioning properly, when the articulation position between the first frame portion 222 and the second frame portion 224 is within the cushion region. The first value detected by first pressure sensor 642 and the second value detected by second pressure sensor 644 may be directly used for checking. If functioning properly, both of the first neutralizer 542 and second neutralizer 546 are de-energized and therefore the first value and the second value should be low. If the first value is high (substantially higher than zero), this means the first neutralizer 542 may be incorrectly in energized state. Likewise, if the second value is high (substantially higher than zero), this means that the second neutralizer 546 may be incorrectly in energized state Therefore, when steering to the left, in the steering or cushion region, the diagnostic coverage can be obtained by the first and second pressure sensors 642, 644.

A table 2.3 summarizes the above description that when steering to the left, the first value (related to the first neutralizer 542) and the second value (related to the second neutralizer 546) are compared, with reference to the articulation position (within steering region or cushion region) to diagnose whether the first neutralizer 542 and the second neutralizer 546 are working (without being incorrectly in de-energized nor energized state.) The diagnostic coverage is used to detect single point failure for the first or second neutralizer 542, 546.

TABLE 2.3

| Steering State | First Value = Second Value | First Value > Second Value | First Value < Second Value |
|---|---|---|---|
| Steering Region | First neutralizer and Second neutralizer Energized | Second neutralizer incorrectly De-energized state | First neutralizer incorrectly de-energized state |
| Cushion Region | First neutralizer and Second neutralizer De-energized | First neutralizer incorrectly Energized state | Second neutralizer incorrectly Energized state |

Similarly, with respect to steering to the right, the third pressure sensor 646 and fourth pressure sensor 648 coupled to the neutralizer unit 56 has mirror fashion. A table 2.4 demonstrates that when steering to the right, the third value (related to the third neutralizer 562) and the fourth value (related to the fourth neutralizer 566) are compared, with reference to the articulation position (within steering region or cushion region) to diagnose whether the third neutralizer 562 and the fourth neutralizer 566 are working (without being incorrectly in de-energized nor energized state.) The diagnostic coverage is used to detect single point failure for the third or fourth neutralizer 562, 566.

TABLE 2.4

| Steering State | Third Value = Fourth Value | Third Value > Fourth Value | Third Value < Fourth Value |
|---|---|---|---|
| Steering Region | Third neutralizer and Fourth neutralizer Energized | Fourth neutralizer incorrectly in De-energized state | Third neutralizer incorrectly in energized state |
| Cushion Region | Third neutralizer and Fourth neutralizer de-energized | Third neutralizer incorrectly in Energized state | Fourth neutralizer incorrectly in Energized state |

Figure 6B:
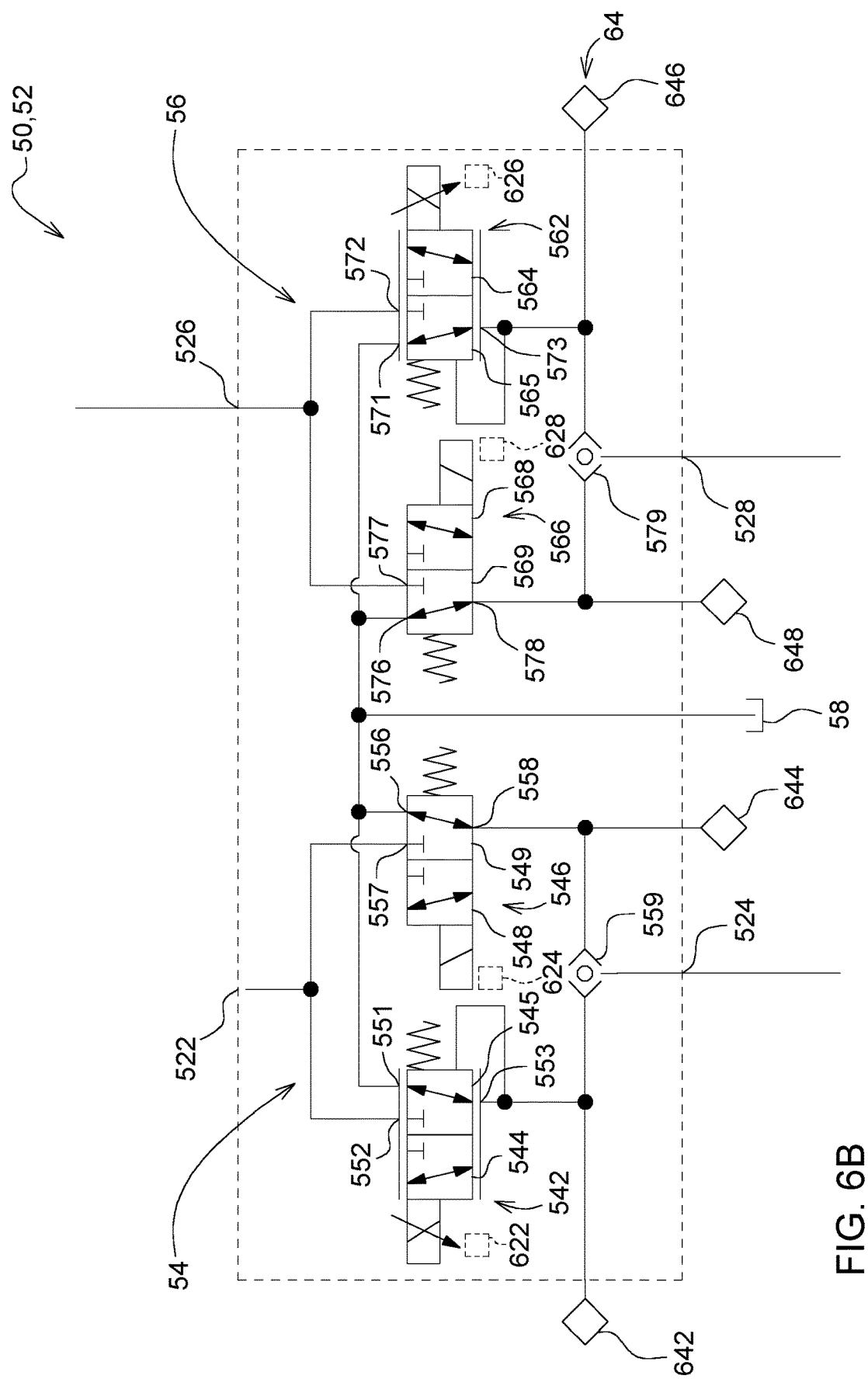
FIG. 6B demonstrates a seventh embodiment of a pilot neutralizer system.

As to the seventh embodiment, with reference to FIG. 6B, one of the first neutralizer 542 and the second neutralizer 546, and one of the third neutralizer 562 and the fourth neutralizer 566 are proportional pressure reducing (solenoid) valves with default to minimum pressure output. In this embodiment, the first neutralizer 542 and the third neutralizer 562 are the proportional pressure reducing valves, and the second neutralizer 546 and the fourth neutralizer 566 are on/off solenoid valve. Having one neutralizer (first neutralizer 542/second neutralizer 546) of the neutralizer unit 54 and one neutralizer (third neutralizer 562/fourth neutralizer 566) of the neutralizer unit 56 as proportional pressure reducing valves allows for progressive cushion control. Instead of having the steering neutralized abruptly in an on/off fashion, the pilot signal/command to the proportional solenoid valves can be ramped on to gradually decrease the steer left or steer right pilot pressure. The gradual reduction in steer left or steer right pilot pressure will ease the steering to a stop allowing for a smoother operation for the operator. With proportional pressure reducing (solenoid) valves with default to minimum pressure output, at full command to the solenoid there will be no reduction in input pilot pressure at the output, and at zero command to the solenoid the output pressure (of the pilot signal) will be reduced to minimum output. The first, second, third, and fourth neutralizers 542, 546, 562, 566 are powered by the controller 70 or a separate power source (not shown).

Figure 6C:
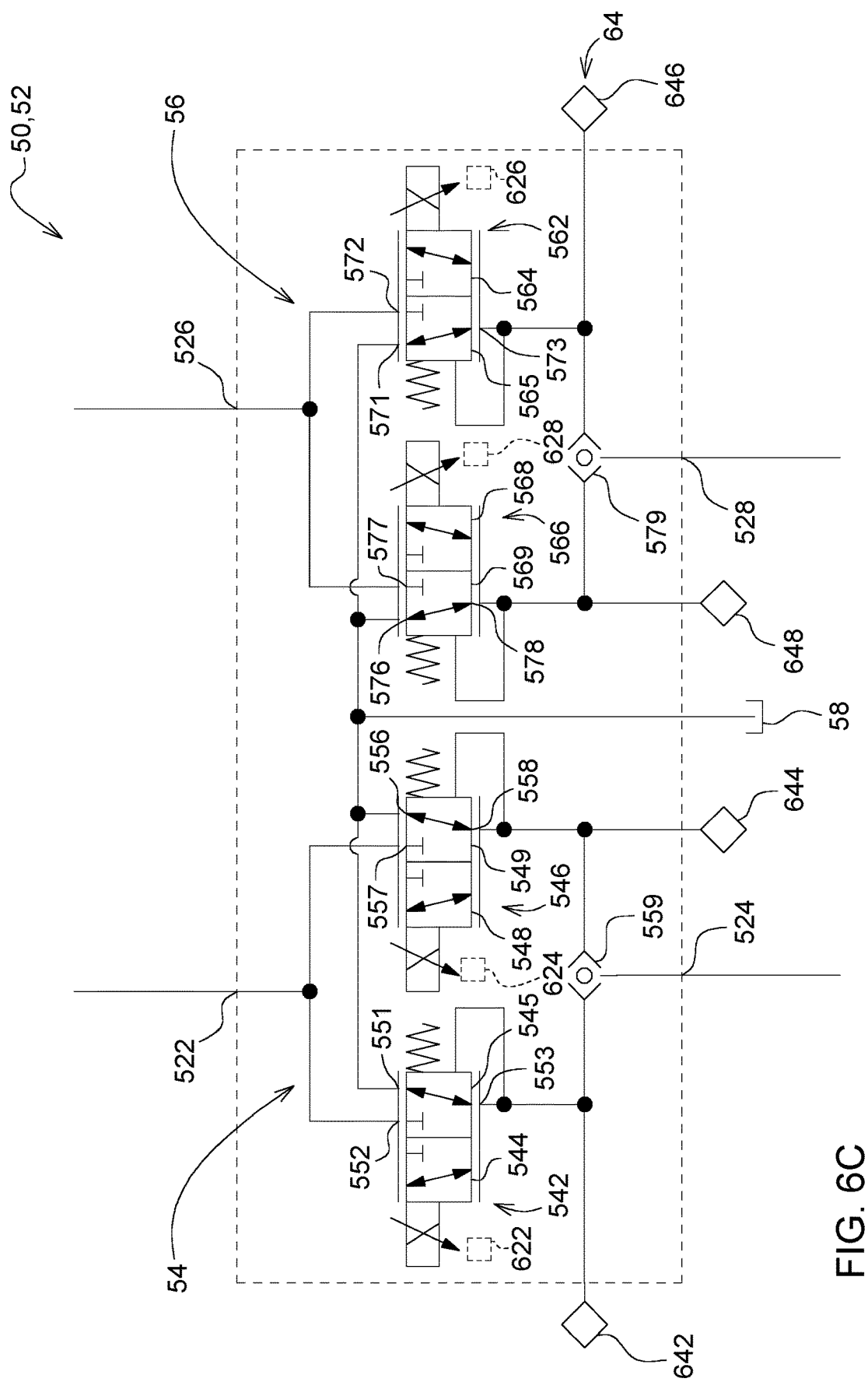
FIG. 6C demonstrates an eighth embodiment of a pilot neutralizer system.

As to the eighth embodiment, with reference to FIG. 6C, the first neutralizer 542, the second neutralizer 546, the third neutralizer 562, and the fourth neutralizer 566 are proportional pressure reducing (solenoid) valves with default to minimum pressure output.

It is noted that the pilot neutralizing system 50 may alternatively include position sensors 62 to diagnose incorrectly de-energized or incorrectly energized state of the first neutralizer 542, the second neutralizer 546, the third neutralizer 562, and the fourth neutralizer 566. The position sensors 62, for example, may detect the positions of actuators of the neutralizers. As shown in FIGS. 5A-5C, the position sensors 62 include a first position sensor 622, a second position sensor 624, a third position sensor 626, and a fourth position sensor 628. The first position sensor 622 detects the positions of the first neutralizer 542, the second position sensor 624 detects the positions of the second neutralizer 546, the third position sensor 626 detects the positions of the third neutralizer 562, and the fourth position sensor 628 detects the positions of the fourth neutralizer 566. As described in the first and second embodiments, the position sensor 62 can determine whether the neutralizers are incorrectly in de-energized or energized state.

Figure 7A:
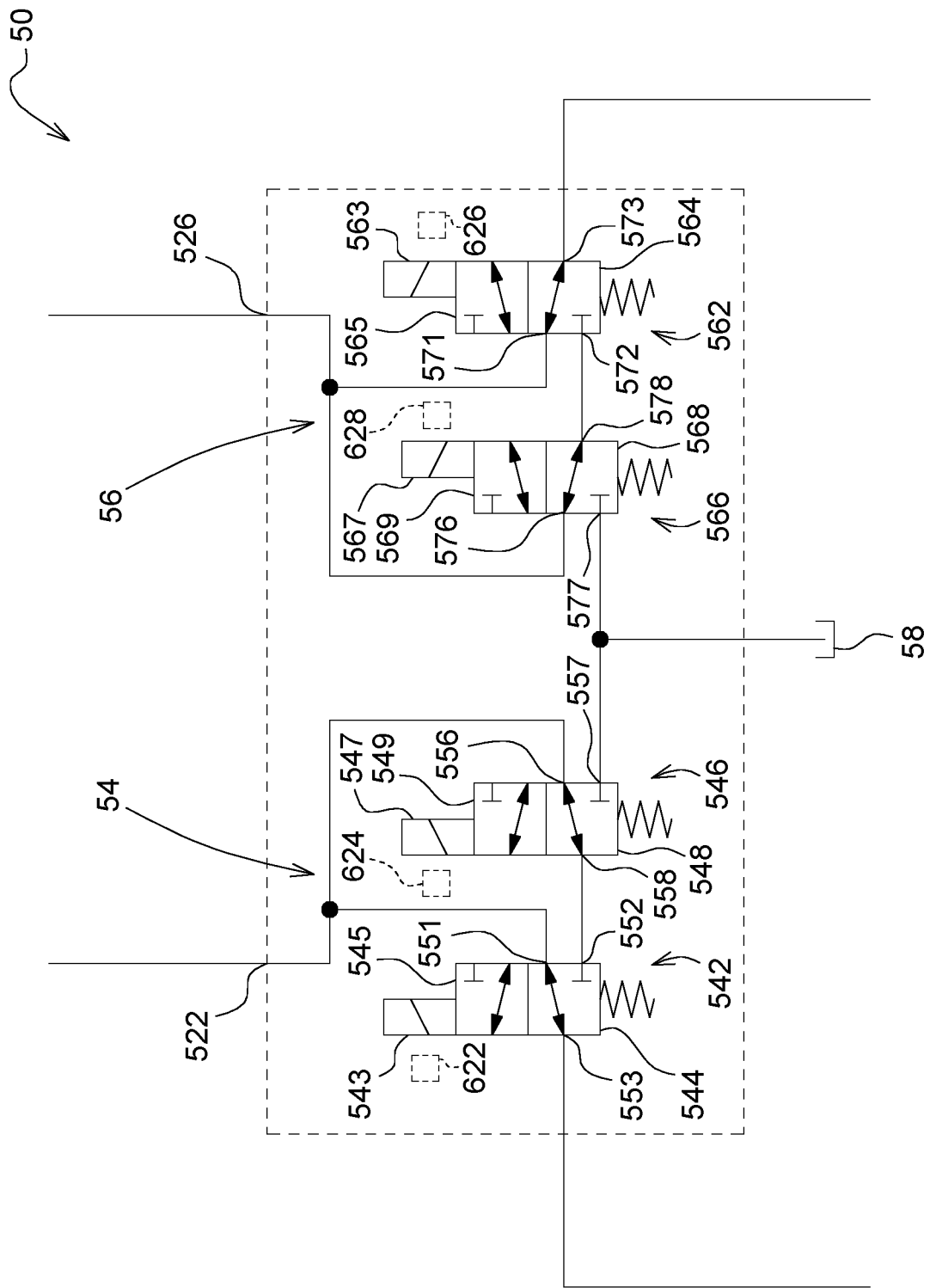
FIG. 7A demonstrates a ninth embodiment of a pilot neutralizer system.

E. Ninth to Eleventh Embodiments: Multiple Neutralizers in a Partial Serial Arrangement for Each Side of the Steering Valve; Default to the Steering Valve As to the ninth embodiment, with reference to FIG. 7A, the first neutralizer 542 includes the first de-energized port 551, the first energized port 552, and the first outlet 553, and the second neutralizer 546 includes the second de-energized port 556, the second energized port 557, and the second outlet 558 coupled to the first energized port 552. The third neutralizer 562 includes the third de-energized port 571, the third energized port 572, and the third outlet 573, and the fourth neutralizer 566 includes the fourth de-energized port 576, the fourth energized port 577, and the fourth outlet 578 coupled to the third energized port 572. Take steering to the left for example. When the articulation position between the first frame portion 222 and the second frame portion 224 is within the left steering region, the first neutralizer 542 and the second neutralizer 546 are de-energized to connect the first de-energized port 551 and the first outlet 553 (position 544) such that the pilot signal flows from the operator control member 282 to one end of the steering spool 342 (shown in FIG. 3) through the first neutralizer 542. The pilot signal flowing from the second outlet 558 is blocked by the first energized port 552, which is disconnected from the first outlet 553 (position 544). When the articulation position between the first frame portion 222 and the second frame portion 224 is within the left cushion region, the first neutralizer 542 and the second neutralizer 546 are energized to connect the first outlet 553 and the first energized port 552 (position 545) and to connect the second outlet 558 and second energized port 557 such that the pilot signal drains back from the steering spool 342 through the first neutralizer 542 and through the second neutralizer 546 to the reservoir 58.

In this embodiment, each of the neutralizer unit 54 and the neutralizer unit 56 also includes two neutralizers for redundancy. The design allows for a single point failure to one of the first neutralizer 542 and the second neutralizer 546 (or one of the third neutralizer 562 and the fourth neutralizer 566) to be absorbed without the loss of steering in either direction. For instance, if the first neutralizer 542 is incorrectly in the energized state, steering control will not be lost. When the articulation position is in the steering region, the first neutralizer 542, which is incorrectly in the energized state, the first neutralizer pilot outlet 553 and the first energized port 552 are connected, such that the pilot signal can flow from the second neutralizer 546 (via the connection between the second de-energized port 556 and the second outlet 558, as shown in the position 548 in this embodiment) through the first neutralizer 542 (position 545) and to the steering spool 342. When the articulation position is in the cushion region, the cushioning functionality will continue to work and the first neutralizer 542 incorrectly in the energized state and the second neutralizer 546 is energized by the controller 70. In that situation, the first outlet 553 and the first energized port 552 are connected and the second outlet 558 and the second energized port 557 are connected, the pilot signal can drain back from the steering valve 34 through the first neutralizer 542 and then through the second neutralizer 546 to the reservoir 58. A single point failure to one of the solenoids will not result in a loss of normal steering. If the first neutralizer 542 is instead incorrectly in the de-energized state, the steering control will be normal since the first neutralizer 542 is in the de-energized state. Steer left cushioning functionality will be disabled. This is because when the articulation position between the first frame portion 222 and the second frame portion 224 enters the steer left cushion region, the second neutralizer 546 will be in the energized state but the first neutralizer 542 will remain in the de-energized state.

An explanatory table 3.1 summarizes the above description that when steering to the left, the status of the first and second neutralizers 542, 546 affecting the normal steer left functionality and steer left cushion functionality. It is noted that "Functioning Properly" designated in the table means the first and second neutralizers 542, 546 can be properly energized and de-energized.

TABLE 3.1

| First Neutralizer Status | Second Neutralizer Status | Normal Steer Left Functionality | Steer Left Cushion Functionality |
|---|---|---|---|
| Functioning Properly | Functioning Properly | Functioning Properly | Functioning Properly |
| Incorrectly in De-energized State | Functioning Properly | Functioning Properly | Disabled |
| Incorrectly in Energized State | Functioning Properly | Functioning Properly | Functioning Properly |
| Functioning Properly | Incorrectly in De-energized State | Functioning Properly | Disabled |
| Functioning Properly | Incorrectly in Energized State | Functioning Properly | Functioning Properly |

An explanatory table 3.2 illustrates a mirror fashion that when steering to the right, the status of the third and fourth neutralizers 562, 566 affecting the normal steer right functionality and steer right cushion functionality.

TABLE 3.2

| Third Neutralizer Status | Fourth Neutralizer Status | Normal Steer Right Functionality | Steer Right Cushion Functionality |
|---|---|---|---|
| Functioning Properly | Functioning Properly | Functioning Properly | Functioning Properly |
| Incorrectly in De-energized State | Functioning Properly | Functioning Properly | Disabled |
| Incorrectly in Energized State | Functioning Properly | Functioning Properly | Functioning Properly |
| Functioning Properly | Incorrectly in De-energized State | Functioning Properly | Disabled |
| Functioning Properly | Incorrectly in Energized State | Functioning Properly | Functioning Properly |

Diagnosing whether the first, second, third, and fourth neutralizer 542, 546, 562, 566 incorrectly in de-energized or energized state in this embodiment is to use the respective position sensors (first position sensor 622, second position sensor 624, third position sensor 626, and fourth position sensor 628) similar to first position sensor 622 and third position sensor 626 of the sensors 60 described in the first embodiment and therefore the method is omitted.

Figure 7B:
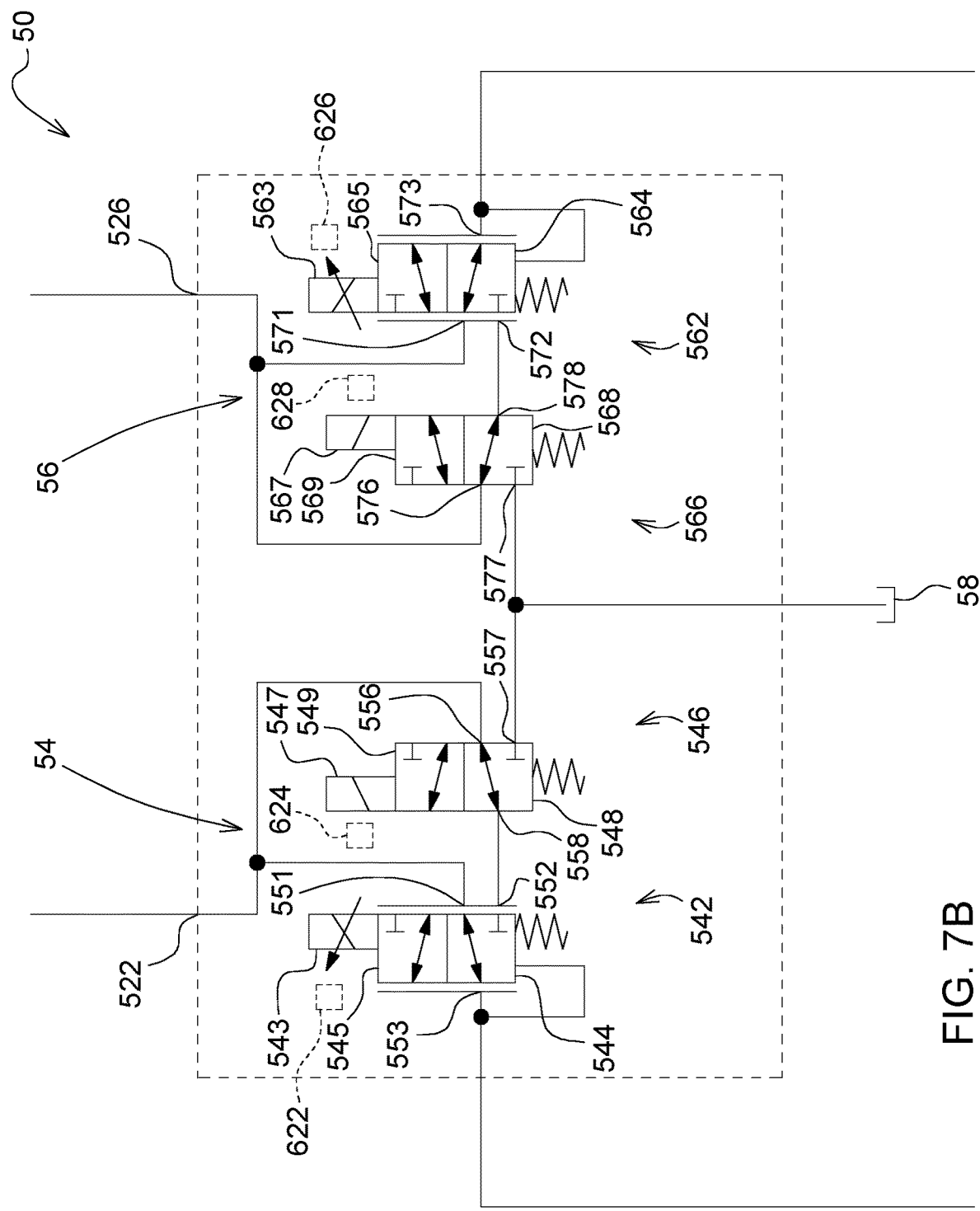
FIG. 7B demonstrates a tenth embodiment of a pilot neutralizer system.

As to the tenth embodiment, with reference to FIG. 7B, one of the first neutralizer 542 and the second neutralizer 546, and one of the third neutralizer 562 and the fourth neutralizer 566 are proportional pressure reducing (solenoid) valves with default to maximum pressure output. In this embodiment, the first neutralizer 542 and the third neutralizer 562 are the proportional pressure reducing valves, and the second neutralizer 546 and the fourth neutralizer 566 are on/off solenoid valves. Having one neutralizer (first neutralizer 542/second neutralizer 546) of the neutralizer unit 54 and one neutralizer (third neutralizer 562/fourth neutralizer 566) of the neutralizer 56 as proportional pressure reducing valves allows for progressive cushion control. Instead of having the steering neutralized abruptly in an on/off fashion, the pilot signal/command to the proportional solenoid valves can be ramped on to gradually decrease the steer left or steer right pilot pressure. The gradual reduction in steer left or steer right pilot pressure will ease the steering to a stop allowing for a smoother operation for the operator. With proportional pressure reducing (solenoid) valves with default to maximum pressure output, at zero command to the solenoid there will be no reduction in input pilot pressure at the output. At full command to the solenoid the output pressure will be reduced to minimum output. Therefore, with the loss of electrical power, the proportional pressure reducing (solenoid) valves with default to maximum pressure output will default to no reduction in steering pilot pressure.

Figure 7C:
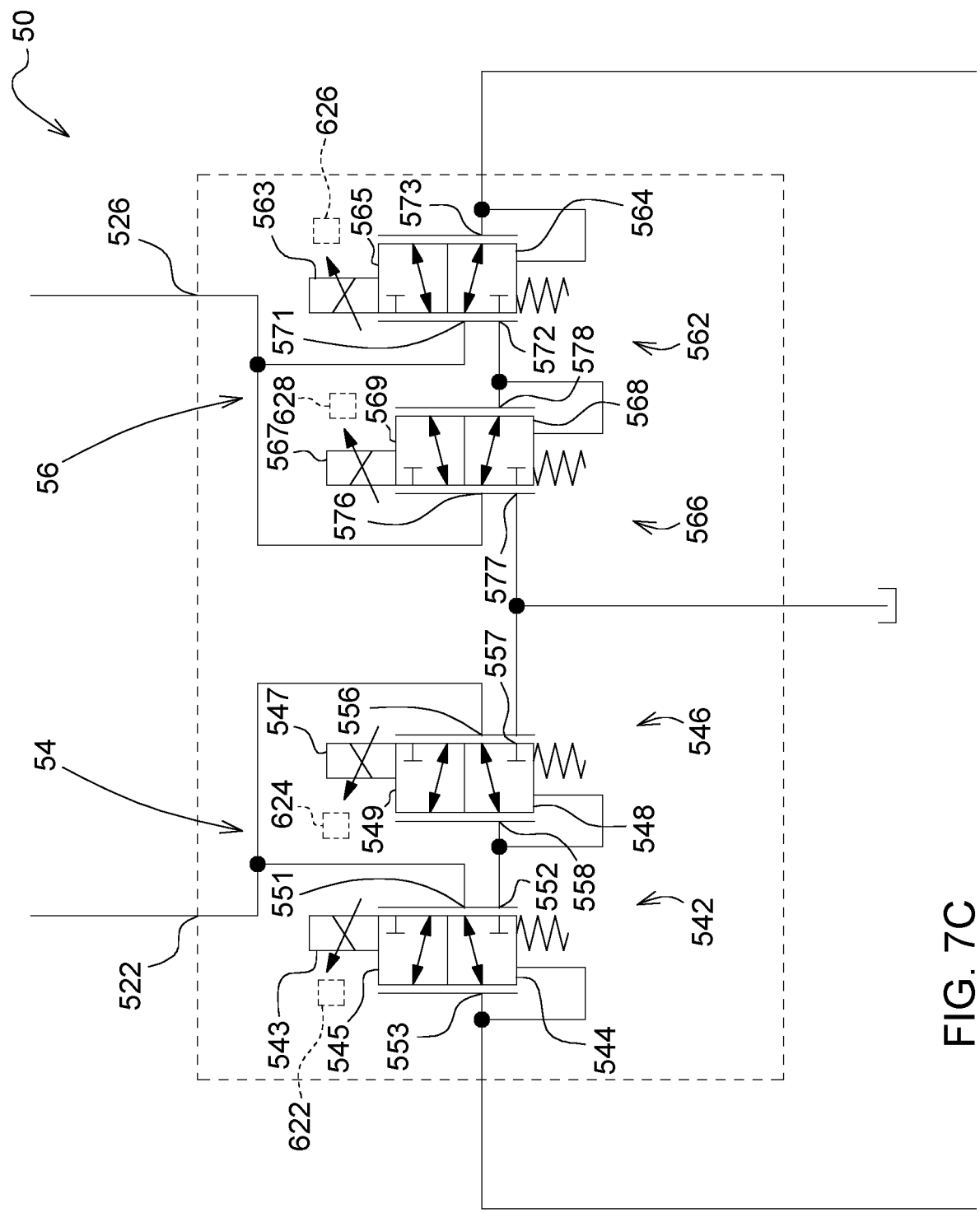
FIG. 7C demonstrates an eleventh embodiment of a pilot neutralizer system.

As to the eleventh embodiment, with reference to FIG. 7C, the first neutralizer 542, the second neutralizer 546, the third neutralizer 562, and the fourth neutralizer 566 are proportional pressure reducing (solenoid) valves with default to maximum pressure output.

Figure 8A:
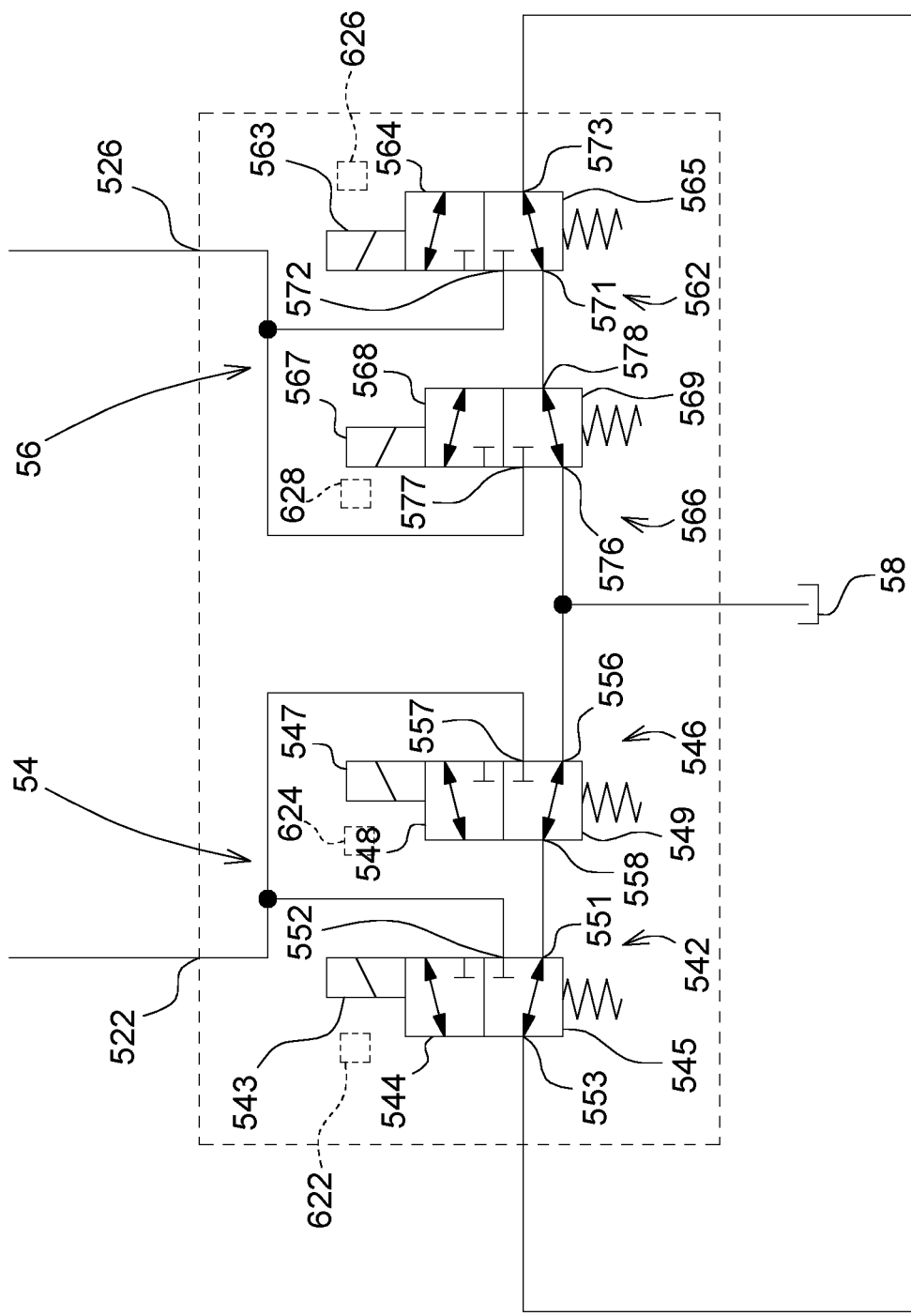
FIG. 8A demonstrates a twelfth embodiment of a pilot neutralizer system.

F. Twelfth to Fourteenth Embodiments: Multiple Neutralizers in a Partial Serial Arrangement for Each Side of the Steering Valve; Default to the Tank As to twelfth embodiment, with reference to FIG. 8A, the pilot neutralizing system 50 is similar to that in the ninth embodiment, except it defaults to the reservoir 58 and the positions of the first to the fourth neutralizer 542, 546, 562, 566 exchange.

Take steering to the left for example. When the articulation position between the first frame portion 222 and the second frame portion 224 is within the left steering region, the first neutralizer 542 and the second neutralizer 546 are energized to connect the port 552 and the first outlet 553 (position 544) such that the pilot signal flows from the operator control member 282 to one end of the steering spool 342 (shown in FIG. 3) through the first neutralizer 542. The pilot signal flowing from the second outlet 558 is blocked by the first de-energized port 551, which is disconnected from the first outlet 553 (position 544). When the articulation position between the first frame portion 222 and the second frame portion 224 is within the left cushion region, the first neutralizer 542 and the second neutralizer 546 are de-energized to connect the first outlet 553 and the first de-energized port 551 (position 545) and to connect the second outlet 558 and second de-energized port 556 (position 549) such that the pilot signal drains back from the steering spool 342 through the first neutralizer 542 and through the second neutralizer 546 to the reservoir 58.

In this embodiment, like the ninth embodiment, each of the neutralizer unit 54 and the neutralizer unit 56 also includes two neutralizers for redundancy. The design allows for a single point failure to one of the first neutralizer 542 and the second neutralizer 546 (or one of the third neutralizer 562 and the fourth neutralizer 566) to be absorbed without the loss of steering in either direction. For instance, if the first neutralizer 542 is incorrectly in the de-energized state, steering control will not be lost. When the articulation position is in the steering region, the first neutralizer 542, which is incorrectly in the de-energized state, the first neutralizer pilot outlet 553 and the first de-energized port 551 are connected, such that the pilot signal can flow from the second neutralizer 546 (via the connection between the second energized port 557 and the second outlet 558, i.e. position 548) through the first neutralizer 542 (position 545) and to the steering spool 342. When the articulation position is within the cushion region, cushioning functionality will continue to work because the first neutralizer 542 is incorrectly in the de-energized state and the second neutralizer 546 is de-energized by the controller 70. In that situation, the first outlet 553 and the first de-energized port 551 are connected and the second outlet 558 and the second de-energized port 556 are connected; the pilot signal can drain back from the steering valve 34 through the first neutralizer 542 and then through the second neutralizer 546 to the reservoir 58. A single point failure to one of the solenoids will not result in a loss of normal steering. If the first neutralizer 542 is instead incorrectly in the energized state, the steering control will be normal since the first neutralizer 542 is in the energized state. Nonetheless, the steer left cushioning functionality will be disabled. This is because when the articulation position between the first frame portion 222 and the second frame portion 224 enters the steer left cushion region, the pilot signal does not flow from the first de-energized outlet 551.

An explanatory table 4.1 summarizes the above description that when steering to the left, the status of the first and second neutralizers 542, 546 affecting the normal steer left functionality and steer left cushion functionality. It is noted that "Functioning Properly" designated in the table means the first and second neutralizers 542, 546 can be properly energized and de-energized.

TABLE 4.1

| First Neutralizer Status | Second Neutralizer Status | Normal Steer Left Functionality | Steer Left Cushion Functionality |
| --- | --- | --- | --- |
| Functioning Properly | Functioning Properly | Functioning Properly | Functioning Properly |
| Incorrectly in De-energized State | Functioning Properly | Functioning Properly | Functioning Properly |
| Incorrectly in Energized State | Functioning Properly | Functioning Properly | Disabled |
| Functioning Properly | Incorrectly in De-energized State | Functioning Properly | Functioning Properly |
| Functioning Properly | Incorrectly in Energized State | Functioning Properly | Disabled |

An explanatory table 4.2 illustrate a mirror fashion that when steering to the right, the status of the third and fourth neutralizers 562, 566 affecting the normal steer right functionality and steer right cushion functionality.

TABLE 4.2

| Third Neutralizer Status | Fourth Neutralizer Status | Normal Steer Right Functionality | Steer Right Cushion Functionality |
| --- | --- | --- | --- |
| Functioning Properly | Functioning Properly | Functioning Properly | Functioning Properly |
| Incorrectly in De-energized State | Functioning Properly | Functioning Properly | Functioning Properly |
| Incorrectly in Energized State | Functioning Properly | Functioning Properly | Disabled |
| Functioning Properly | Incorrectly in De-energized State | Functioning Properly | Functioning Properly |
| Functioning Properly | Incorrectly in Energized State | Functioning Properly | Disabled |

Figure 8B:
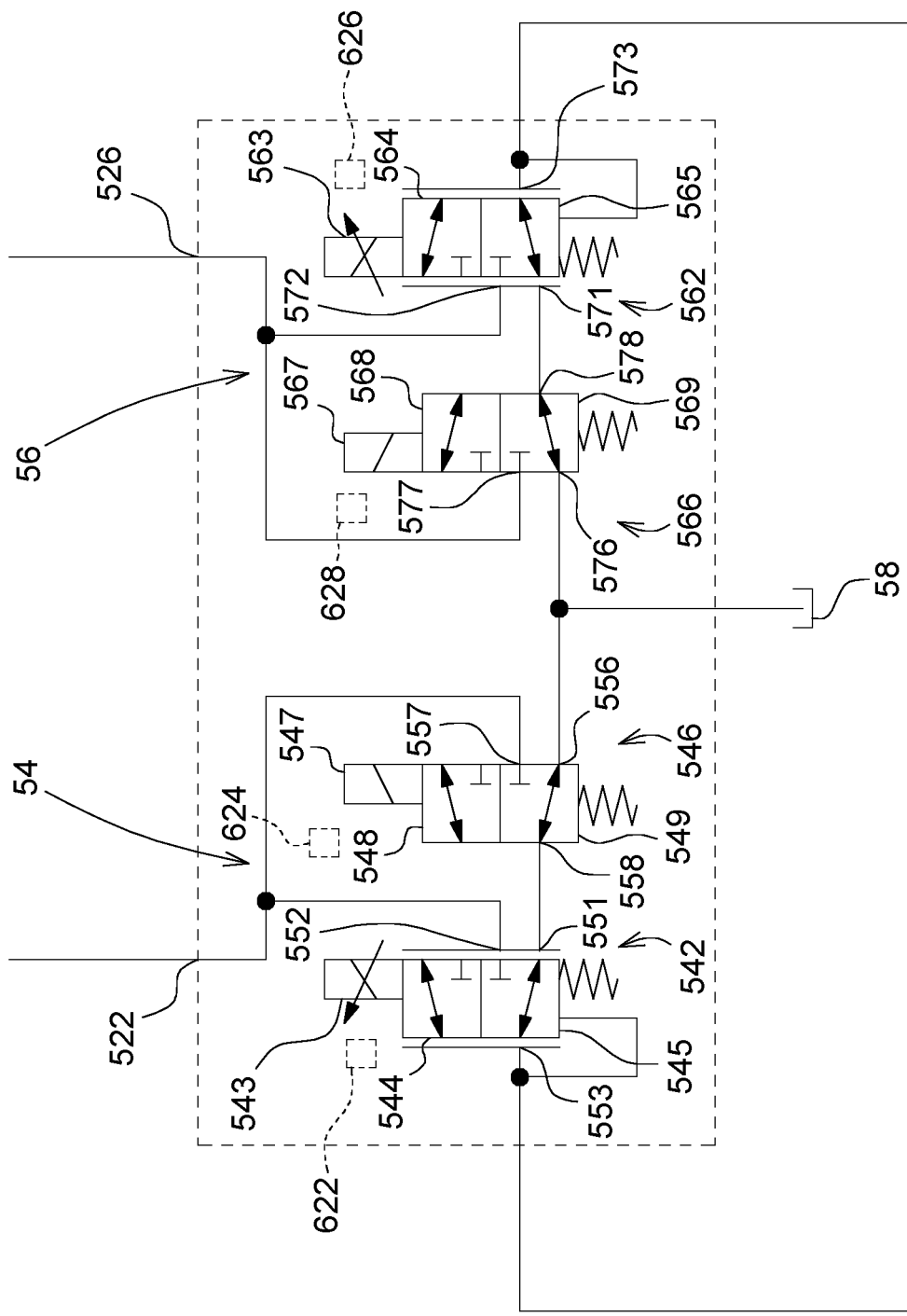
FIG. 8B demonstrates a thirteenth embodiment of a pilot neutralizer system.

As to the thirteenth embodiment, with reference to FIG. 8B, one of the first neutralizer 542 and the second neutralizer 546, and one of the third neutralizer 562 and the fourth neutralizer 566 are proportional pressure reducing (solenoid) valves with default to minimum pressure output. In this embodiment, the first neutralizer 542 and the third neutralizer 562 are the proportional pressure reducing valves, and the second neutralizer 546 and the fourth neutralizer 566 are on/off solenoid valves. Having one neutralizer (first neutralizer 542/second neutralizer 546) of the neutralizer unit 54 and one neutralizer (third neutralizer 562/fourth neutralizer 566) of the neutralizer unit 56 as proportional pressure reducing valves allows for progressive cushion control. Instead of having the steering neutralized abruptly in an on/off fashion, the pilot signal/command to the proportional solenoid valves can be ramped off to gradually decrease the steer left or steer right pilot pressure. The gradual reduction in steer left or steer right pilot pressure will ease the steering to a stop allowing for a smoother operation for the operator. With proportional pressure reducing (solenoid) valves with default to minimum pressure output, at full command to the solenoid there will be no reduction in input pilot pressure at the output, and at zero command to the solenoid the output pressure (of the pilot signal) will be reduced to minimum. The first, second, third, and fourth neutralizers 542, 546, 562, 566 are powered by the controller 70 or a separate power source (not shown).

Figure 8C:
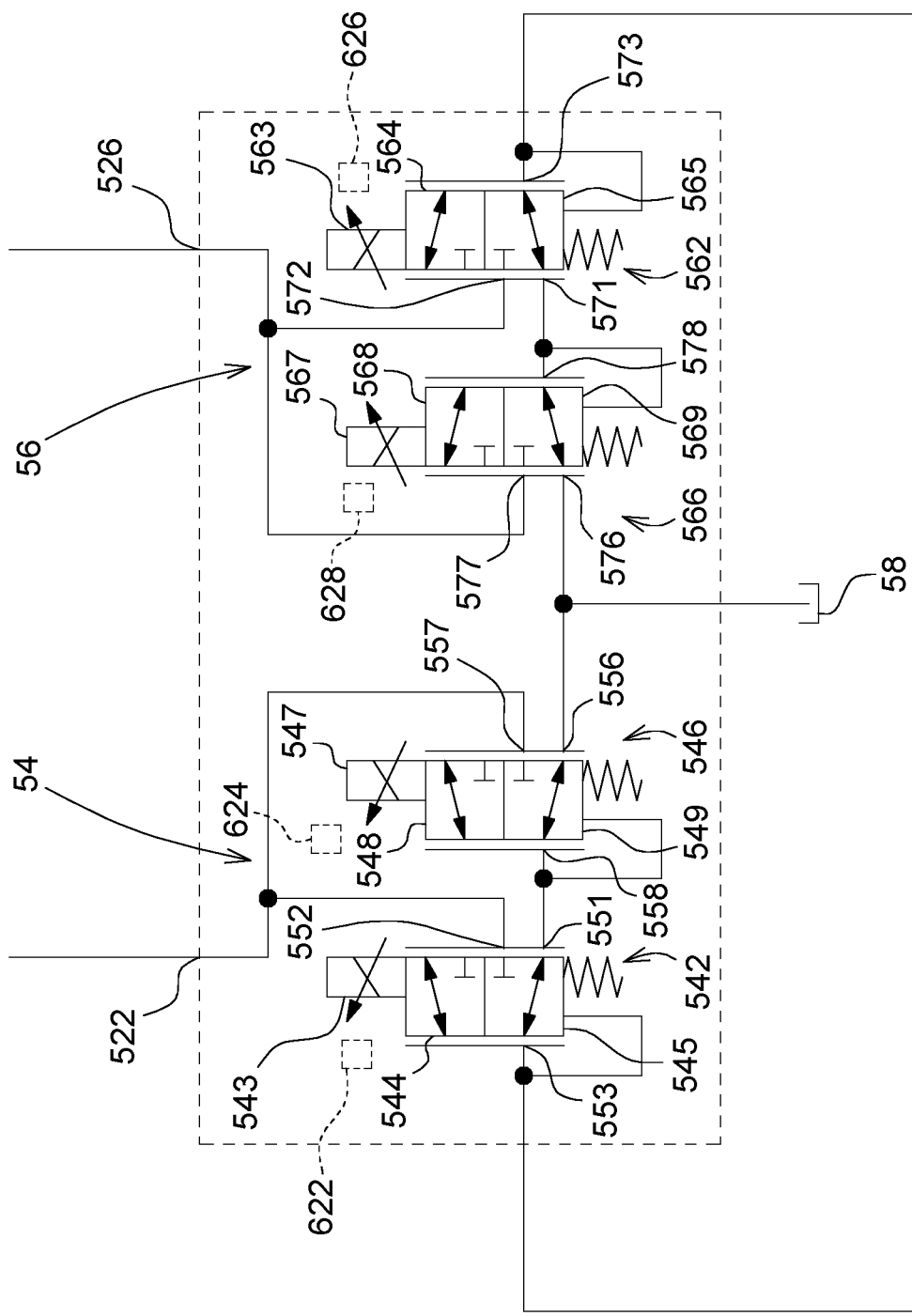
FIG. 8C demonstrates a fourteenth embodiment of a pilot neutralizer system.

As to the fourteenth embodiment, with reference to FIG. 8C, the first neutralizer 542, the second neutralizer 546, the third neutralizer 562 and the fourth neutralizer 566 are proportional pressure reducing (solenoid) valves with default to minimum pressure output.

G. Fifteenth to Nineteenth Embodiments: Pilot Signal Flow Control on Reservoir Line The fifteenth to nineteenth embodiments demonstrate a flow control apparatus 80 applied on the reservoir line/tank line, which is the pilot signal returning line between the neutralizers 542, 546, 562, 566 and the reservoir 58. The flow control apparatus 80 of the four embodiments are applied on the reservoir line of the third embodiment, but they can be applied to other embodiments and variations.

Figure 9A:
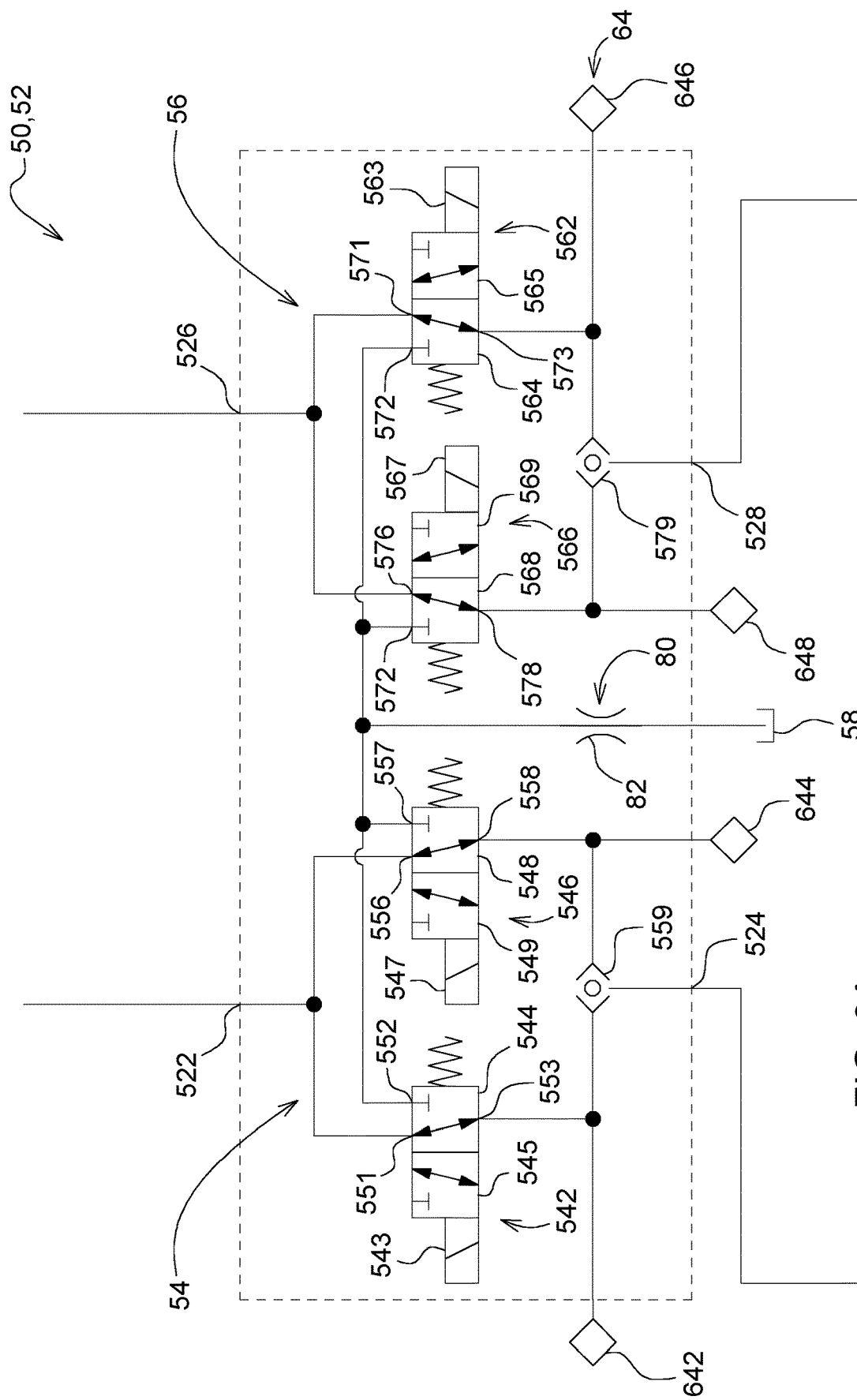
FIG. 9A demonstrates a fifteenth embodiment of a pilot neutralizer system.

As to fifteenth embodiment, with reference to FIG. 9A, the flow control apparatus 80 is an orifice 82 arranged in the reservoir line. Having the orifice slows down the drain of the outputs of the (solenoid) neutralizer valves, including the first to fourth neutralizers 542, 546, 562, 566. Having a slow drain allows for progressive cushion control. For instance, if the articulation position is in the steering region and the operator steers the work vehicle 20 into the left steer cushion region, the first neutralizer 542 and the second neutralizer 546 shift to have their outputs connected to the drain path/reservoir line. The orifice 82 slowly drains off the first neutralizer 542 and the second neutralizer 546 output pressures to more slowly move the steering spool 342 to neutral and bring steering to a smoother stop.

Figure 9B:
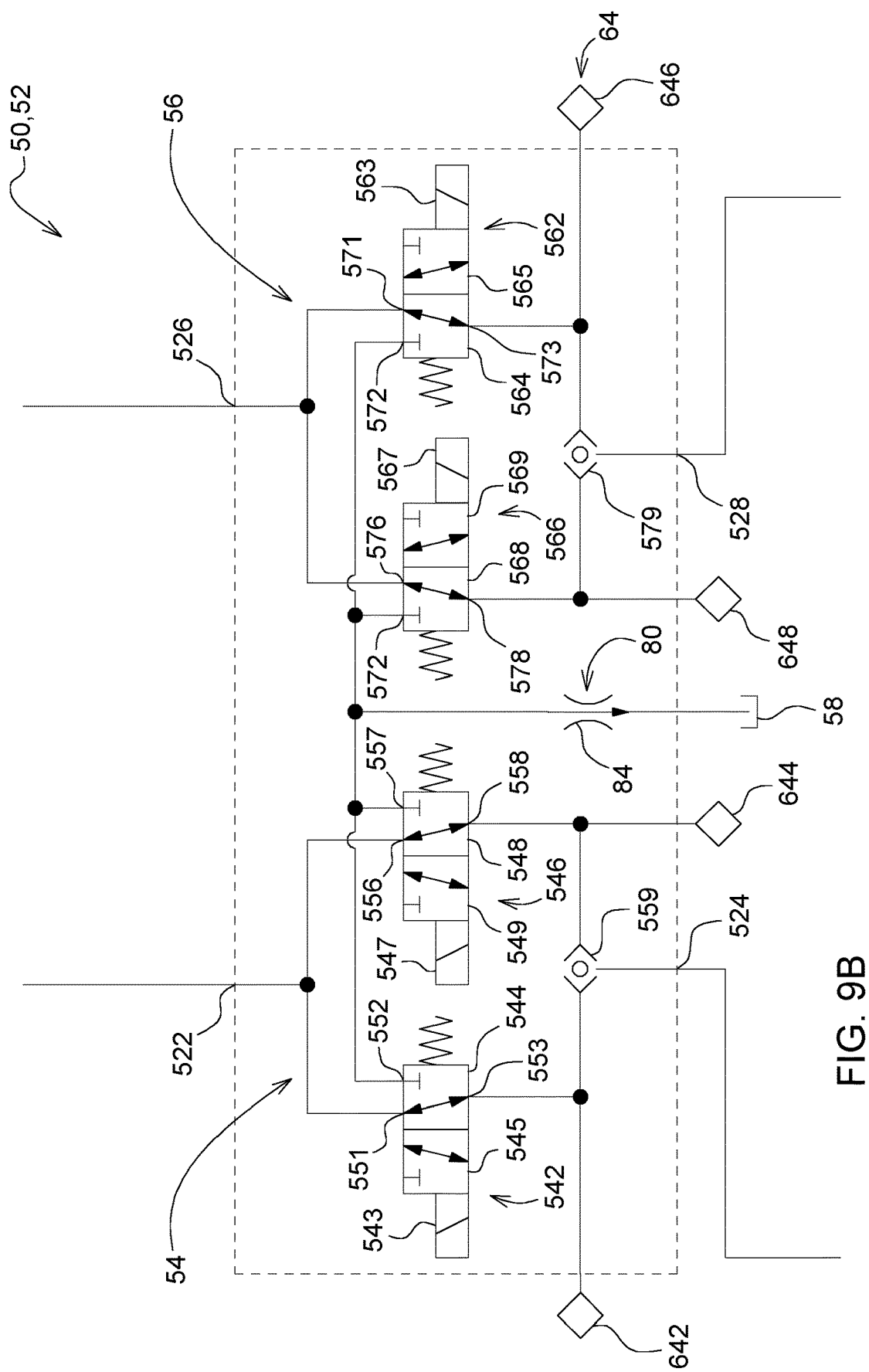
FIG. 9B demonstrates a sixteenth embodiment of a pilot neutralizer system.

As to sixteenth embodiment, with reference to FIG. 9B, the flow control apparatus 80 is a pressure compensated flow regulator 84 in the reservoir line. Having the pressure compensated flow regulator 84 slows down the drain of the outputs of the (solenoid) neutralizer valves, including the first to fourth neutralizers 542, 546, 562, 566. In addition, the pressure compensated flow regulator provides a consistent drain flow regardless of the pressure drop across it. With the pressure compensated flow regulator 84, the pilot signal can more slowly move the steering spool to neutral and brings steering to a smoother stop.

Figure 9C:
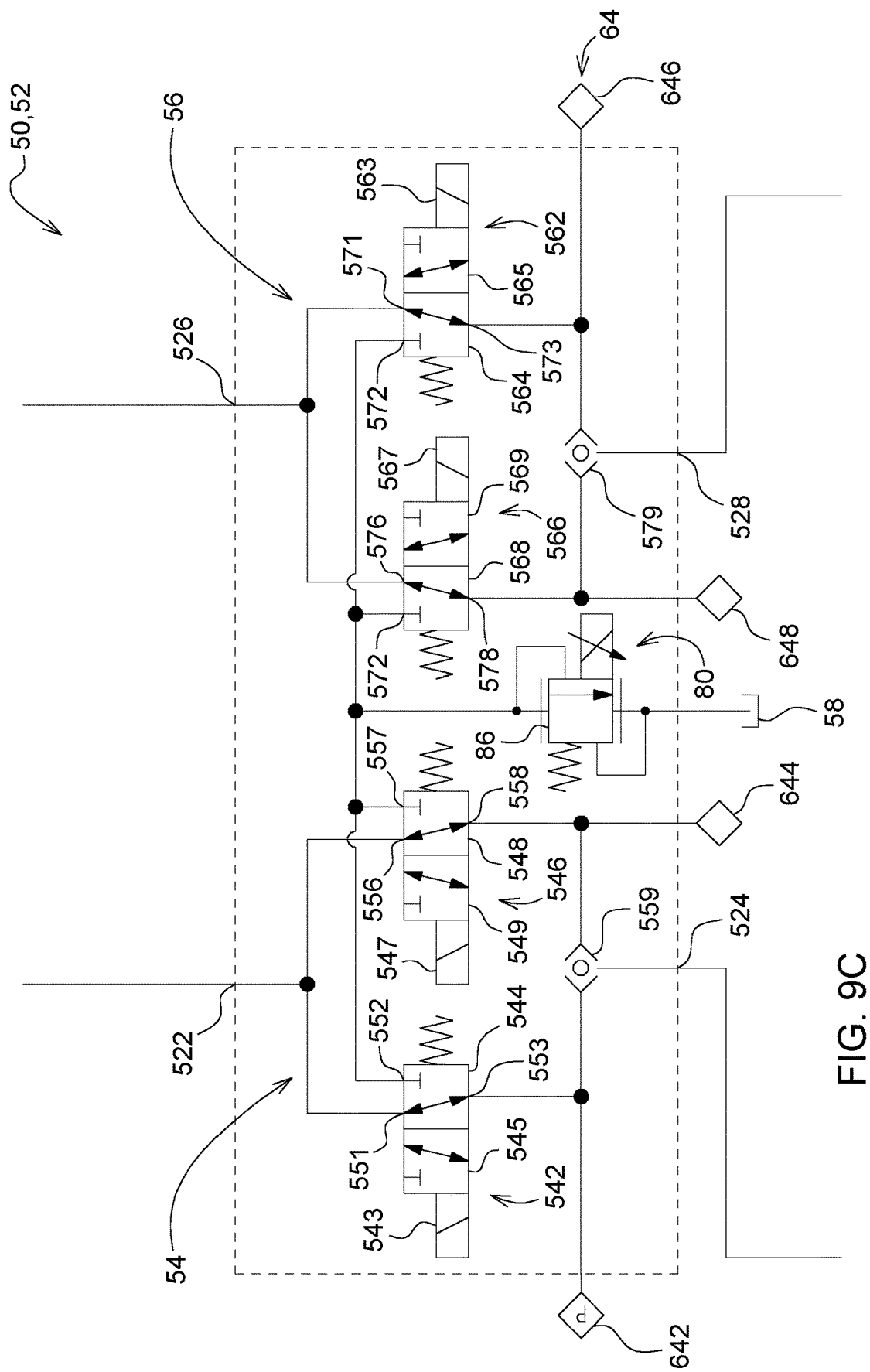
FIG. 9C demonstrates a seventeenth embodiment of a pilot neutralizer system.
Figure 9D:
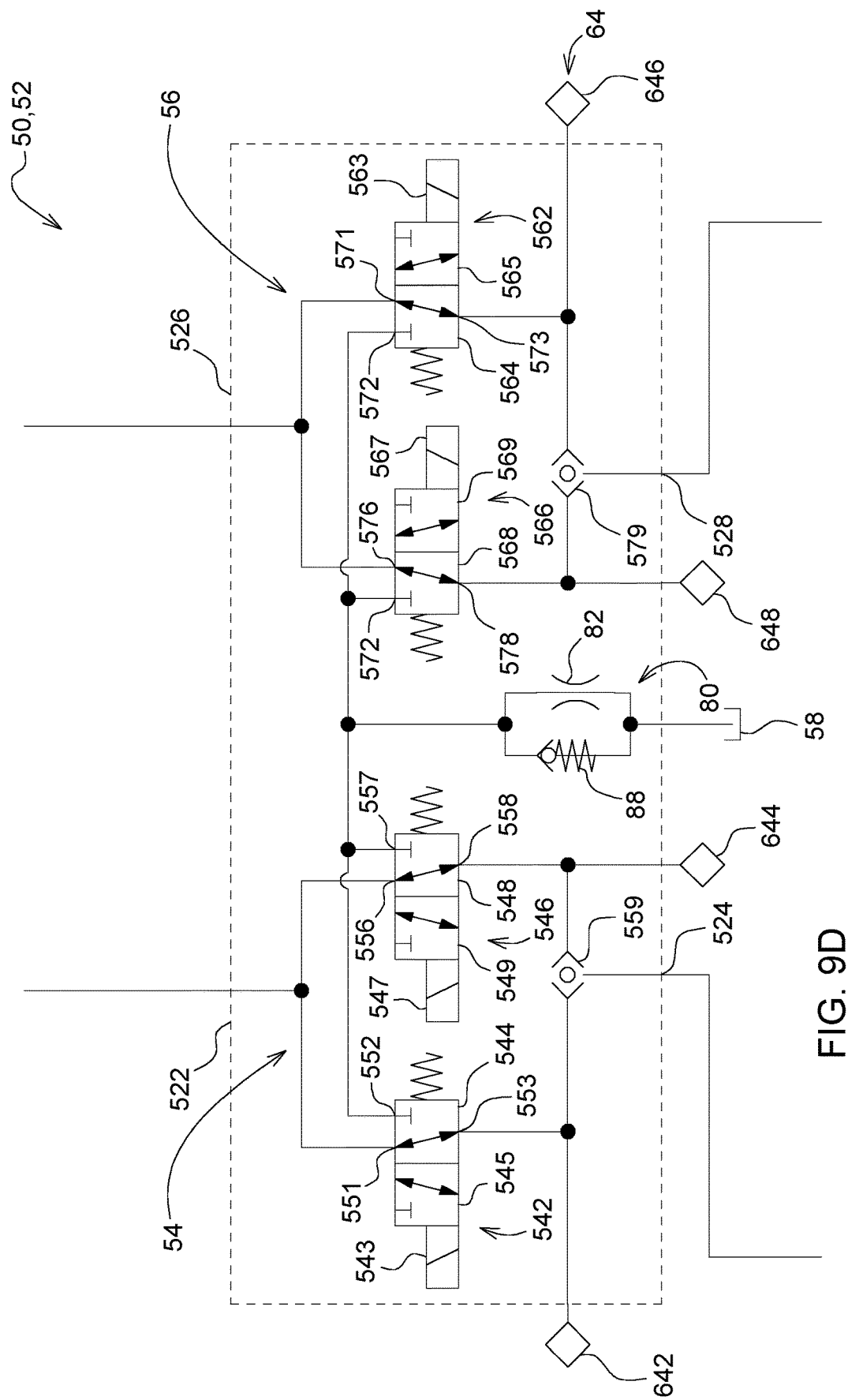
FIG. 9D demonstrates an eighteenth embodiment of a pilot neutralizer system.
Figure 10:
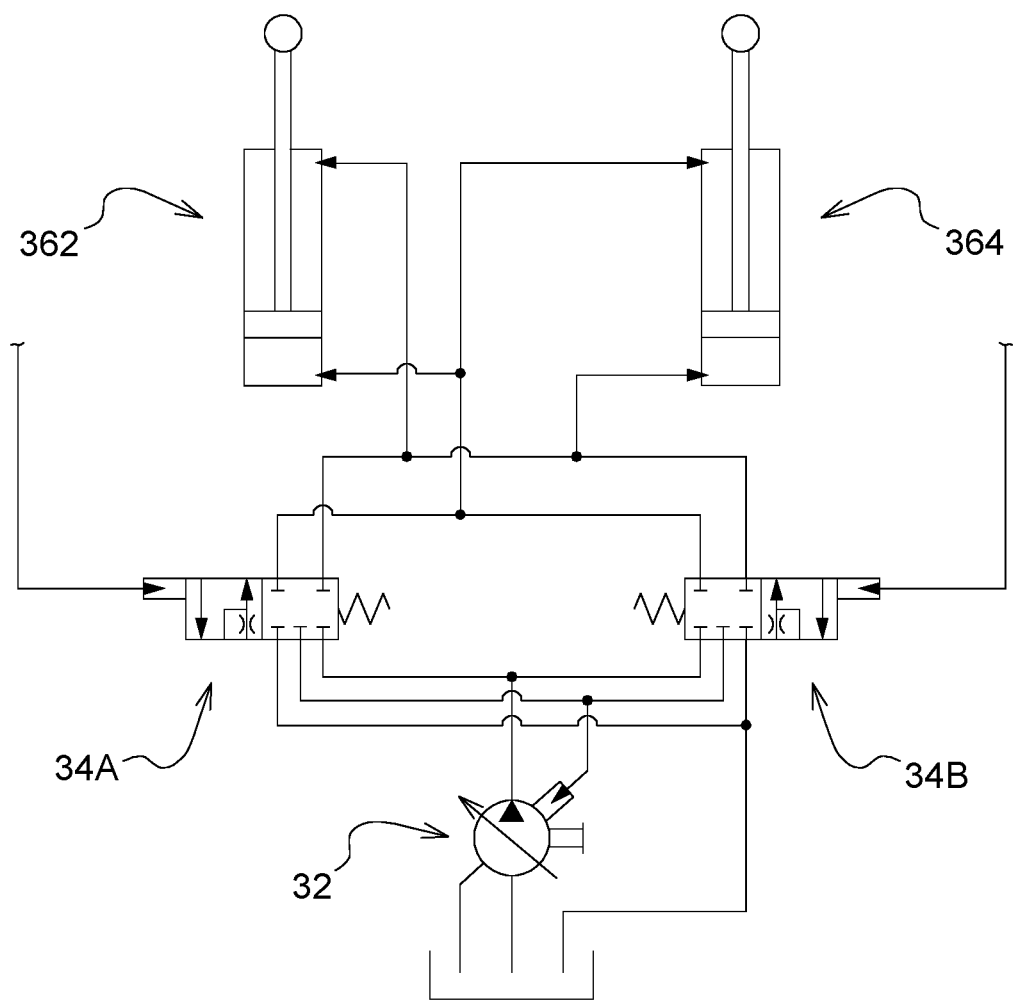
FIG. 10 demonstrates a schematic of another hydraulic circuit coupled to a nineteenth embodiment of a pilot neutralizer system.

As to seventeenth embodiment, with reference to FIG. 9C, the flow control apparatus 80 is a proportional relief valve 86 which is electronically controlled in the reservoir line. Having the electronically controlled proportional relief valve 86 allows for pressure control of the outputs of the first to the fourth neutralizers 542, 546, 562, 566 when they are in the output connected to the reservoir 58 position. Slowly ramping the command to the proportional relief valve 86 allows for progressive cushion control. For instance, if the articulation position is in the steering region and the operator steers the work vehicle 20 into the left steer cushion region, the first neutralizer 542 and the second neutralizer 546 will shift to have their outputs connected to the drain path/reservoir line. The command to the proportional relief valve 86 can be varied to slowly reduce the first neutralizer 542 and the second neutralizer 546 output pressures to more slowly move the steering spool to neutral and bring steering to a smoother stop. The proportional relief valve can be inverse or standard proportional.

As to eighteenth embodiment, with reference to 9D, the flow control apparatus 80 includes an orifice 82 and a check valve 88 (or relief valve) in parallel in the reservoir line/tank line. The orifice 82 works similarly to the orifice 82 in the fifteenth embodiment, so as to slowly drain off the first, second third, fourth neutralizers 542, 546, 562, 566 output pressure to meter the steering spool 342 to neutral providing a smoother transition to the steering stop. The check valve 88 (relief valve) allows a quick reduction in the first to the fourth neutralizer 542, 546, 562, 566 output pressure to the pressure setting of the check valve 88 (relief valve). The setting of the check valve 88 (relief valve) is in the range of the pilot pressure required to shift the steering spool 342 to a low steering flow position. Therefore, for instance, when entering the left steer cushion region, the output of the first neutralizer 542 and the second neutralizer 546 will be connected to the drain path (reservoir line) and the output pressure of the first neutralizer 542 and the second neutralizer 546 will quickly be reduced to the check valve 88 (relief valve) pressure setting by flowing though the check valve 88 (relief valve) to shift the steering spool 342 to a low flow position. In this regard, the check valve 88 slows the steering down quickly to a lower flow and then the rest of the first neutralizer 542 and the second neutralizer output pressure will slowly drain off through the orifice 82. The operator can feel of a large reduction in steering velocity in a short amount of time followed by a slow rate of change from a low steering velocity to zero steering velocity. This gives the operator of an indication that the cushion region has been entered, slow down the steering quick enough so the frames do not contact, but still ease to a stop for operator comfort. The check valve 88 (relief valve) can be either a spring-loaded check valve or a relief valve.

In other words, with reference to 9D, the check valve 88/relief valve has a pressure threshold. When the articulation position between the first frame portion 222 and the second frame portion 224 is within the cushion region and a pressure of the pilot signal is equal to or higher than the pressure threshold, the pilot signal flows through the flow control apparatus 80 in a first draining rate. When the articulation position between the first frame portion 222 and the second frame portion 224 is within the cushion region and the pressure of the pilot signal is lower than the pressure threshold, the pilot signal flows through the flow control apparatus 80 in a second draining rate slower than the first draining rate.

The design, number, and the connection of the operator control member 282, the neutralizers 542, 546, 562, 566, the cylinders 362, 364 etc. are only for illustration. The variations thereof still do not depart from the spirit of the present disclosure. For example, the steering valve mentioned in the previous embodiment can be split into a left steering valve 34A and a right steering valve 34B. When the left steering valve 34A receives a pilot signal, which shifts the left steering valve 34A to the left, the cylinder 362 retracts and the cylinder 364 extends (actuated by the hydraulic fluid from the fluid pump 32), steering the work vehicle to the left. When the right steering valve 34B receives a pilot signal, which shifts the right steering valve 34B to the right, the cylinder 362 extends and the cylinder 364 retracts (actuated by the hydraulic fluid from the fluid pump 32), steering the work vehicle to the right. The pilot neutralizing system as described in the previous embodiments can also be applied to different steering valve(s).

Without in any way limiting the scope, interpretation, or application of the claims appearing below, a technical effect of one or more of the example embodiments disclosed herein is to provide a pilot neutralizer system, which can be energized or de-energized based on the articulation position so as to obtain cushioning function. Another technical effect of one or more of the example embodiments disclosed herein is to diagnose the states of neutralizers in the pilot neutralizer system. It is noted that the first position sensor 622 and/or the first pressure sensor 642 may be referred to as a first sensor; the second position sensor 624 and/or the second pressure sensor 644 may be referred to as a second sensor; the third position sensor 626 and/or the third pressure sensor 646 may be referred to as a third sensor; the fourth position sensor 628 and/or the fourth pressure sensor 648 may be referred to as a fourth sensor.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A work vehicle, comprising:
a frame assembly having a first frame portion and a second frame portion pivotally coupled to the first frame portion;
an actuating assembly configured to pivot the first frame portion relative to the second frame portion;
a fluid pump configured to provide a hydraulic fluid to actuate the actuating assembly;

a steering valve hydraulically coupled to the fluid pump and the actuating assembly and configured to change a direction of the hydraulic fluid to operate the actuating assembly based on positions of the steering valve;

a pilot source configured to provide a pilot signal;

an operator control member coupled to the pilot source and configured to at least partially determine the pilot signal at the steering valve, and the pilot signal configured to determine the positions of the steering valve;

a pilot neutralizing system, comprising:
- a controller configured to electrically receive a signal indicative of an articulation position between the first frame portion and the second frame portion;
- a pilot neutralizer electrically coupled to the controller and hydraulically coupled between the operator control member and the steering valve so as to selectively change the pilot signal at the steering valve; and wherein when the articulation position between the first frame portion and the second frame portion reaches a cushion region during steering, the pilot neutralizer is one of de-energized and energized by the controller to change the pilot signal at the steering valve to resist the actuating assembly from moving.

2. The work vehicle of claim 1, wherein the pilot neutralizer includes an out port coupled to the steering valve and configured for the communication of the pilot signal, a first neutralizer, and a second neutralizer coupled to the first neutralizer.

3. The work vehicle of claim 2, wherein the pilot neutralizer includes a shuttle valve coupled to the out port, and the first neutralizer and the second neutralizer are in a parallel arrangement and coupled to the shuttle valve such that one of the pilot signal from the first neutralizer and the pilot signal from the second neutralizer which has higher pressure flows out from the out port to the steering valve when the articulation position between the first frame portion and the second frame portion is within a steering region.

4. The work vehicle of claim 3, further comprising a first sensor coupled between the first neutralizer and the shuttle valve and configured to detect a pressure of the pilot signal responsive to the first neutralizer, and a second sensor coupled between the second neutralizer and the shuttle valve and configured to detect a pressure of the pilot signal responsive to the second neutralizer.

5. The work vehicle of claim 3, wherein when the articulation position between the first frame portion and the second frame portion is within the steering region, the first neutralizer is de-energized for the pilot signal flowing from the operator control member to the shuttle valve, and the second neutralizer is de-energized for the pilot signal flowing from the operator control member to the shuttle valve, and when the articulation position between the first frame portion and the second frame portion is within the cushion region, the first neutralizer and the second neutralizer are energized for the pilot signal draining back from the steering valve.

6. The work vehicle of claim 5, wherein at least one of the first neutralizer and the second neutralizer is a proportional pressure reducing valve with default to maximum pressure output.

7. The work vehicle of claim 3, wherein when the articulation position between the first frame portion and the second frame portion is within the steering region, the first neutralizer is energized for the pilot signal flowing from the operator control member to the shuttle valve, and the second neutralizer is energized for the pilot signal flowing from the operator control member to the shuttle valve, and when the articulation position between the first frame portion and the second frame portion is within the cushion region, the first neutralizer and the second neutralizer are de-energized for the pilot signal draining back from the steering valve.

8. The work vehicle of claim 7, wherein at least one of the first neutralizer and the second neutralizer is a proportional pressure reducing valve with default to minimum pressure output.

9. The work vehicle of claim 2, wherein the first neutralizer includes a first de-energized port, a first energized port, and a first outlet, and the second neutralizer includes a second de-energized port, a second energized port, and a second outlet coupled to the first energized port, and when the articulation position between the first frame portion and the second frame portion is within a steering region, the first neutralizer and the second neutralizer are de-energized to connect the first de-energized port and the first outlet such that the pilot signal flows from the operator control member to the steering valve through the first neutralizer, and when the articulation position between the first frame portion and the second frame portion is within the cushion region, the first neutralizer and the second neutralizer are energized to connect the first outlet and the first energized port and to connect the second outlet and the second energized port such that the pilot signal drains back from the steering valve through the first neutralizer and then through the second neutralizer.

10. The work vehicle of claim 9, wherein at least one of the first neutralizer and the second neutralizer is proportional pressure reducing valve with default to maximum pressure output.

11. The work vehicle of claim 2, wherein the first neutralizer includes a first de-energized port, a first energized port, and a first outlet, and the second neutralizer includes a second de-energized port, a second energized port, and a second outlet coupled to the first de-energized port, and when the articulation position between the first frame portion and the second frame portion is within a steering region, the first neutralizer and the second neutralizer are energized to connect the first energized port and the first outlet such that the pilot signal flows from the operator control member to the steering valve through the first neutralizer, and when the articulation position between the first frame portion and the second frame portion is within the cushion region, the first neutralizer and the second neutralizer are de-energized to connect the first outlet and the first de-energized port and to connect the second outlet and the second de-energized port such that the pilot signal drains back from the steering valve through the first neutralizer and then through the second neutralizer.

12. The work vehicle of claim 1, wherein the pilot neutralizer includes two neutralizer units, one neutralizer unit coupled between the operator control member and the steering valve, and the other neutralizer unit coupled between the operator control member and the steering valve, and the operator control member determines the pilot signal flowing toward the one of the one neutralizer unit and the other neutralizer unit, and when the articulation position between the first frame portion and the second frame portion is within a steering region during steering, the pilot signal flowing from one of the one neutralizer unit and the other neutralizer unit determines the positions of the steering valve, and when the articulation position between the first frame portion and the second frame portion is within the cushion region during steering, one of the one neutralizer unit and the other neutralizer unit drains the pilot signal from the steering valve to a reservoir.

13. The work vehicle of claim 12, wherein the one neutralizer unit includes a first neutralizer and a second neutralizer, and the other neutralizer unit includes a third neutralizer and a fourth neutralizer.

14. The work vehicle of claim 1, wherein the pilot neutralizer is hydraulically coupled to a reservoir, such that when the articulation position between the first frame portion and the second frame portion reaches the cushion region during steering, the pilot neutralizer directs the pilot signal to the reservoir and blocks the pilot signal from the operator control member.

15. The work vehicle of claim 14, further comprising an orifice positioned between the pilot neutralizer and the reservoir.

16. The work vehicle of claim 14, further comprising a flow regulator positioned between the pilot neutralizer and the reservoir.

17. The work vehicle of claim 14, further comprising a proportional relief valve positioned between the pilot neutralizer and the reservoir.

18. The work vehicle of claim 14, further comprising an orifice and one of a check valve and a relief valve coupled to the orifice in a parallel arrangement, and the orifice and one of the check valve and the relief valve positioned between the pilot neutralizer and the reservoir.

19. The work vehicle of claim 1, wherein the actuating assembly includes a first actuator and a second actuator, and when the first actuator retracts and the second actuator extends, the first frame portion pivots relatively to the second frame portion in a first direction, and when the second actuator retracts and the first actuator extends, the first frame portion pivots relatively to the second frame portion in a second direction.

20. A pilot neutralizing system of a work vehicle, the work vehicle comprising a frame assembly having a first frame portion and a second frame portion pivotally coupled to the first frame portion, an actuating assembly configured to pivot the first frame portion relative to the second frame portion, the pilot neutralizing system comprising:
   a pilot neutralizer electrically coupled to a controller receiving a signal indicative of an articulation position between the first frame portion and the second frame portion, and the pilot neutralizer hydraulically coupled between an operator control member and a steering valve to selectively change a pilot signal at the steering valve, the pilot signal configured to switch the steering valve so as to change a direction of a hydraulic fluid flowing from the steering valve to the actuating assembly; and
   wherein when the articulation position between the first frame portion and the second frame portion reaches a cushion region during steering, the pilot neutralizer is one of de-energized and energized by the controller to change the pilot signal at the steering valve to resist the actuating assembly from moving.

21. The pilot neutralizing system of claim 20, wherein the pilot neutralizer includes an out port coupled to the steering valve and configured for the communication of the pilot signal, a first neutralizer, and a second neutralizer coupled to the first neutralizer.

22. The pilot neutralizing system of claim 21, wherein the pilot neutralizer includes a shuttle valve coupled to the out port, and the first neutralizer and the second neutralizer are in a parallel arrangement and coupled to the shuttle valve such that one of the pilot signal from the first neutralizer and the pilot signal from the second neutralizer that has higher pressure flows out from the out port to the steering valve when the articulation position between the first frame portion and the second frame portion is within a steering region.

23. The pilot neutralizing system of claim 22, wherein when the articulation position between the first frame portion and the second frame portion is within the steering region, the first neutralizer is de-energized for the pilot signal flowing from the operator control member to the shuttle valve, and the second neutralizer is de-energized for the pilot signal flowing from the operator control member to the shuttle valve, and when the articulation position between the first frame portion and the second frame portion is within the cushion region, the first neutralizer and the second neutralizer are energized for the pilot signal draining back from the steering valve.

24. The pilot neutralizing system of claim 22, wherein when the articulation position between the first frame portion and the second frame portion is within the steering region, the first neutralizer is energized for the pilot signal flowing from the operator control member to the shuttle valve, and the second neutralizer is energized for the pilot signal flowing from the operator control member to the shuttle valve, and when the articulation position between the first frame portion and the second frame portion is within the cushion region, the first neutralizer and the second neutralizer are de-energized for the pilot signal draining back from the steering valve.

25. The pilot neutralizing system of claim 21, wherein the first neutralizer includes a first de-energized port, a first energized port, and a first outlet, and the second neutralizer includes a second de-energized port, a second energized port, and a second outlet coupled to the first energized port, and when the articulation position between the first frame portion and the second frame portion is within a steering region, the first neutralizer and the second neutralizer are de-energized to connect the first de-energized port and the first outlet such that the pilot signal flows from the operator control member to the steering valve through the first neutralizer, and when the articulation position between the first frame portion and the second frame portion is within the cushion region, the first neutralizer and the second neutralizer are energized to connect the first outlet and the first energized port and to connect the second outlet and the second energized port such that the pilot signal drains back from the steering valve through the first neutralizer and then through the second neutralizer.

26. The pilot neutralizing system of claim 21, wherein the first neutralizer includes a first de-energized port, a first energized port, and a first outlet, and the second neutralizer includes a second de-energized port, a second energized port, and a second outlet coupled to the first de-energized port, and when the articulation position between the first frame portion and the second frame portion is within a steering region, the first neutralizer and the second neutralizer are energized to connect the first energized port and the first outlet such that the pilot signal flows from the operator control member to the steering valve through the first neutralizer, and when the articulation position between the first frame portion and the second frame portion is within the cushion region, the first neutralizer and the second neutralizer are de-energized to connect the first outlet and the first de-energized port and to connect the second outlet and the second de-energized port such that the pilot signal drains back from the steering valve through the first neutralizer and then through the second neutralizer.

27. The pilot neutralizing system of claim 20, wherein when the articulation position between the first frame portion and the second frame portion is within a steering region, the pilot neutralizer is de-energized to provide a communication of the pilot signal between the operator control member and the steering valve, and when the articulation position between the first frame portion and the second frame portion reaches the cushion region, the pilot neutralizer is energized to change a direction of the pilot signal to a reservoir.

28. The pilot neutralizing system of claim 20, wherein when the articulation position between the first frame portion and the second frame portion is within a steering region, the pilot neutralizer is energized to provide a communication of the pilot signal between the operator control member and the steering valve, and when the articulation position between the first frame portion and the second frame portion reaches the cushion region, the pilot neutralizer is de-energized to change a direction of the pilot signal to a reservoir.

29. A method for controlling an actuating assembly of a work vehicle during steering, comprising:

detecting an articulation position between a first frame portion and a second frame portion during steering;

receiving a signal indicative of the articulation position by a controller electrically coupled to a pilot neutralizer;

changing a powering status of the pilot neutralizer by the controller so as to change a pilot signal at a steering valve when the articulation position between the first frame portion and the second frame portion reaches a cushion region during steering; and changing positions of the steering valve at least partially determined by the pilot direction of the pilot signal to change a direction of a hydraulic fluid flowing into the steering valve, so as to resist the actuating assembly from moving to pivot the first frame portion relative to the second frame portion.

* * * * *